(12) United States Patent
Shenoi

(10) Patent No.: US 7,636,022 B2
(45) Date of Patent: Dec. 22, 2009

(54) ADAPTIVE PLAY-OUT BUFFERS AND CLOCK OPERATION IN PACKET NETWORKS

(75) Inventor: Kishan Shenoi, Saratoga, CA (US)

(73) Assignee: Symmetricom, Inc., San Jose, CA (US)

( * ) Notice: Subject to any disclaimer, the term of this patent is extended or adjusted under 35 U.S.C. 154(b) by 569 days.

(21) Appl. No.: 11/451,652

(22) Filed: Jun. 12, 2006

(65) Prior Publication Data

US 2007/0036180 A1    Feb. 15, 2007

Related U.S. Application Data

(60) Provisional application No. 60/689,630, filed on Jun. 10, 2005, provisional application No. 60/689,629, filed on Jun. 10, 2005.

(51) Int. Cl.
*H03B 1/00* (2006.01)
(52) U.S. Cl. .................................. 331/177 R; 331/1 A
(58) Field of Classification Search ................. 331/1 A; 327/129
See application file for complete search history.

(56) References Cited

U.S. PATENT DOCUMENTS

| 4,636,734 | A | * | 1/1987 | Genrich ...................... 327/106 |
| 5,786,778 | A | * | 7/1998 | Adams et al. ................. 341/61 |
| 2003/0053493 | A1 | * | 3/2003 | Graham Mobley et al. .. 370/538 |

* cited by examiner

*Primary Examiner*—Joseph Chang
(74) *Attorney, Agent, or Firm*—Patterson & Sheridan, L.L.P.

(57) ABSTRACT

Methods and apparatus are described for a play-out buffer. A method includes writing a data packet into a jitter buffer at a write address specified by a write address generator; incrementing the write address generator; generating the difference between the write address and a current read address specified by a read address generator; reading a data packet from the jitter buffer from the current read address specified by the read address generator; generating a new read address based on the difference between the write address and the current read address by the read address generator. An apparatus includes a jitter buffer; a write address generator for storing a write address; a read address generator for storing a current read address; a read address increment control; wherein the read address increment control sets the future read address based on the difference between the write address and the current read address. Another method of driving a numerically controlled oscillator includes providing a local clock with a clock cycle; generating a numerical value during each clock cycle; adding the numerical value to an accumulator having a most significant bit; and using the value of the most significant bit as an oscillator. Another apparatus includes a local clock with a clock cycle; a jitter buffer having a write address and a current read address; a first accumulator; a second accumulator having a most significant bit; an increment control; wherein the increment control sets an accumulation value to be added to the first accumulator based on the difference between the write address and the current read address; wherein the value of the second accumulator depends on the first accumulator; and wherein the most significant bit functions as an oscillator.

29 Claims, 9 Drawing Sheets

ADAPTIVE PLAY-OUT BUFFERS AND CLOCK OPERATION IN PACKET NETWORKS

CROSS-REFERENCE(S) TO RELATED APPLICATION(S)

This application claims a benefit of priority under 35 U.S.C. 119(e) from provisional patent applications U.S. Ser. No. 60/689,630, filed Jun. 10, 2005 and U.S. Ser. No. 60/689,629, filed Jun. 10, 2005 the entire contents of both of which are hereby expressly incorporated herein by reference for all purposes.

BACKGROUND INFORMATION

1. Field of the Invention

Embodiments of the invention relate generally to the field of electronic data transmission. More particularly, an embodiment of the invention relates-to a buffer and a clock in a packet-based network, and methods of buffering incoming data and synchronizing clocks in such networks.

2. Discussion of the Related Art

With the advent of Internet Protocol ("IP"), packet-based transmission and routing schemes are becoming ever more popular. It is well accepted that Next Generation Networks ("NGN"s) will be built upon these principles. However, several services, such as real-time voice and voice-band communication, that are well suited for circuit-switched ("TDM") transmission and switching, have to be supported by this new architecture. VoIP ("voice over IP") is one such example. The underlying premise of VoIP is that speech, after conversion from analog to digital format, can be packetized and several protocols such as RTP and RTCP (see Ref. [1,2]) have been developed to support the ability of IP networks to provide such real-time services.

One of the premises of NGNs is that the Quality of Experience (QoE) should be at least as good as good, or even better than, that provided by the legacy circuit-switched network or PSTN (Public Switched Telephone Network). It is clear that delay is an important parameter in determining the QoE. It is well known that one-way delays that are very large (of the order of 400 ms or larger) are extremely detrimental from the view of subjective quality, making regular full-duplex conversation difficult. At lower one-way delays, the impact of echo is important. The Quality of Experience, for a given level of Echo Return Loss (ERL) drops rapidly with increasing delay.

The overall delay has four principal components. The process of packetization involves buffering information to fill the packet payload and thus introduces delay. The encoding and decoding algorithms, especially in the case of source codecs, require buffering as well. These two delays are often known quantities. The third component is the delay through the network. This delay is difficult to predict a priori since it depends on the physical distance, the number of intermediate packet switches involved in the end-to-end transport of a packet, the bandwidth of the links between switches (routers). However, for two given end-points there is, in principle, a minimal network delay corresponding to the transit time of the fastest possible packet transmission. Considering that in a pure IP network the transmission path could be different for different packets, and the queuing delay in intermediate nodes is a function of congestion, the delay experienced by packets will be variable, ranging from the minimal delay to infinity (a packet lost in the network is construed as an instance of infinite delay). Obviously, some maximum delay threshold must be determined and packets with delay greater than this maximum are discarded. Received packets are stored in a buffer whose size corresponds to the difference between minimum and maximum delays and so, practically speaking, fast packets are delayed so that the packets can be decoded and converted back to analog signals in a smooth fashion. The notion of play-out, or dejittering, whereby some delay is introduced via a jitter buffer constitutes the fourth delay component. Clearly, in order to maximize the subjective quality of the call, the play-out buffer, also referred to as the jitter buffer, should be as small as possible.

For specificity, consider the situation where a DS1 (1.544 Mbps) is carried over a packet network as depicted in FIG. 1a. The scenario involves two end-user locations with legacy DS1 (T1) terminations and the intent is to provide a private-line connection. In today's (yesterday's) network the DS1 is transported across the network as a bearer channel embedded in a higher-rate assembly such as a DS3 or SONET signal in a "circuit-switched" arrangement. The challenge then is to replace the circuit-switched transport network with a packet-switched network in a manner that is transparent to the end-user. This is achieved by placing an inter-working-function (IWF) at the circuit-packet boundaries. For simplicity FIG. 1a shows one direction of transmission. The "T-IWF" 102a receives the incoming serial data signal from the end-user terminal 101a as a conventional DS1 signal, assembles the bits into packets for delivery across the packet cloud 103a. The "R-IWF" 104a receives the packets and recreates the serial data signal for delivery to the end-user terminal 105a over a conventional T1 (DS1) facility. We assume, again for simplicity, that the bit-stream must be delivered intact and the network does not attempt to extract any framing or channelization information or features such as "flags" or "cells" or "packets" in the data stream. Interfacing with legacy terminal equipment implies that existing standards, such as [1,2], must be adhered to.

The primary functions of the IWF devices are, first, to reassemble the recovered serial bit-stream into octets; second, to assemble these octets into packets where each packet contains N octets of information and launch these packets over the network; third, to receive packets from the network and reassemble the bit-stream; and fourth, to transmit the bit-stream to the end-user equipment utilizing an appropriate clock. Since the delay through the network is not constant, there will be time-delay variations (TDV), the IWF requires an adequate "elastic" buffer to store received packets and absorb this TDV. The current technology approaches fail to adequately create synchronization of the clock for the fourth function.

Strictly speaking, the term synchronization applies to alignment of time and the term syntonization applies to alignment of frequency, but in the telecommunication environment we often use the term synchronization to refer to either time-alignment, or frequency-alignment, or both. It is generally clear from the context which meaning is appropriate. All real-time communication carried over a digital network requires synchronization to some degree. This can be illustrated by considering the example of delivering a real-time voice signal between two geographically disparate points across a network.

The situation is depicted in FIG. 1b, which shows a conventional VoIP network. The analog source is converted into digital format by an analog-to-digital converter (ADC or A/D) 101b operating at a sampling clock rate of nominally 8 kHz. Each sample is, conventionally, quantized to 8 bits so that the digital stream carrying the voice information is 8 kilo-octets-per-second or 64 kbps (see ITU-T Rec. G.711, Ref. [3], and Ref. [4]). This is regarded as a DS0 and represents "uncompressed" voice. In a conventional circuit-switched or TDM (Time Division Multiplexed) architecture, this DS0 is delivered "as is" to the destination for conversion back to analog format. In a packet-switched environment, exemplified by Voice-over-IP (VoIP), the DS0 is, possibly, compressed and organized into packets (102b). These packets are delivered to the destination where the expansion (103b) to DS0 format is performed prior to conversion back to analog (104b). Whereas the schemes described here are applicable regardless of the word-length employed for A/D conversion or D/A conversion, we shall henceforth assume here that these are done with a word-length of 8 bits (1 octet) (representative of μ-law and A-law formats provided in ITU-T Recommendation G.711) for specificity.

It is important to recognize that at each end the digital-to-analog converter (DAC or D/A) and analog-to-digital converter (ADC or A/D) are usually in the same integrated circuit chip and thus the same clock is used for both functions at any one end. In the event that the (digital) signal processing includes echo cancellation, it is mandatory that the same clock be used for both functions else the echo canceller will exhibit sub-par performance and there will be instances of echo leakage and other phenomena that negatively impact the quality of experience. In FIG. 1b we show a single direction of transmission solely for convenience in representation and explanation.

The rate at which packets are generated (in the encoder) is determined by the A/D clock, shown as $f_A$ in FIG. 1b. In most VoIP schemes, one packet is generated for every 160 samples from the A/D converter. That is, using the conventional sampling rate of 8 kHz (nominal), each packet represents 20 ms (ms=millisecond) of speech (there are variants that use block sizes other than 20 ms, such as 10 ms, 30 ms, etc.). The nominal word-length associated with each sample is 8 bits, following G.711 (see Ref. [3]) so the "uncompressed" signal represents a bit-rate of 64 kbps (or DS0). Compression algorithms are employed to reduce the effective bit-rate. For example, ADPCM (adaptive differential pulse code modulation) following ITU-T Recommendation G.726 (see Ref. [5]) reduces the word-length associated with each sample to 4, effectively reducing the data rate to 32 kbps. ITU-T Recommendation G.727 (see Ref. [5]) describes methods for reducing the bits/sample from 8 down to 5 or 4 or 3 or 3, corresponding to bit-rates of 40, 32, 24, and 16 kbps, respectively. More sophisticated schemes, such as those described in ITU-T Recommendation G.723 and G.729 (see Ref. [5]) are even more effective in reducing the bit-rate. The notion of a "20-msec-packet" is the collection of information produced by the coder that permits the decoder at the far end to synthesize a 20-msec block of speech. Depending on the coding algorithm it is possible that information from previous packets is necessary as well. At the receiving end the decoder recreates the appropriate digital signal (DS0) for conversion back into analog format. The D/A clock is shown as $f_D$ in FIG. 1b.

It is immediately obvious that if the frequencies of the A/D clock ($f_A$, and the D/A clock ($f_D$) are not equal, then slips will occur. The notion of a slip is simple. If $f_A > f_D$ then the DAC will experience a surfeit of samples; if $f_A < f_D$ then the DAC will experience a shortage of samples. Rate-adaptation then requires that samples be deleted or inserted. In the circuit-switched architecture of the legacy PSTN, every transmission boundary element is required to extract DS0s from an incoming digital signal (typically a DS1) and reinsert the information into an outgoing digital signal (typically a DS1) that may, potentially, have a different time-base. Therefore slip buffers are very common. To minimize the occurrence of slips, the circuit-switched network is well synchronized and this approach to network synchronization has the derivative benefit that the clock offset between the end points is minimized. In an NGN, where asynchronous transport is employed, there is no guarantee that the clock offset between the end points is negligible.

However, this phenomenon is not necessarily catastrophic, but the DAC would have to either insert or delete a sample to account for the difference in sampling rates. This insertion or deletion of a block of information, such as a sample, is referred to as a slip. Note that a slip is the result of the difference in sampling rates and is independent of the word length associated with the quantization and compression. The degradation of perceptual quality caused by slips is in addition to any degradation caused by other factors. In conventional circuit-switched telephony, the unit of information inserted or deleted is one sample (or octet). Considering the nominal sampling rate is 8 kHz (one sample every 125 μs), a slip occurs when the accumulated phase difference, expressed in time units, caused by the aforementioned frequency difference, crosses 125 μs. In a packetized scenario, the unit could be as large a block of speech, typically of duration 20 ms and thus slips would have an impact similar to packet loss. Note that 20-ms slips occur much less frequently than 125-μs slips but have a greater impact each time they occur. The thrust of the current invention is to get the benefits of single-octet (single-sample) slips in a packet environment.

A similar effect will be observed in real-time video. A typical block size used in video compression is 8×8. Assuming a "standard" sampling arrangement comprising 352 pixels per line, 240 lines per frame, and 30 frames per second, the duration of a block is 25.25 □sec. When the accumulated phase difference between the A/D clock and D/A clock crosses 25.25 μs, a slip occurs. The current invention does not specifically apply to video but video is a good example of real-time communications and included to show the importance of having minimal frequency offsets between the end-points.

In the following table we provide the slip rate assuming that the D/A conversion clock uses a free-running oscillator and that the A/D clock is accurate (relative to a Primary Reference Source). Also provided is the typical technology used for that accuracy and a budgetary estimate (order of magnitude) of the cost of the oscillator. The last three columns provide an approximate time between slip occurrences for different block sizes. In generating this table it was assumed that the transmission link between the A/D and D/A is equivalent to a "null" link that adds no impairments such as excessive time-delay variation or transmission errors. The intent is to lay the baseline for the minimum impairment that is introduced by the lack of synchronization between the end-points.

TABLE 1

Relationship between frequency offset and interval between buffer overflow/underflow events

| Accuracy | Technology | Cost | 125-□sec slip | 20-msec slip | 25.25-□sec slip |
|---|---|---|---|---|---|
| $1 \times 10^{-10}$ | Rubidium | ~$1000 | $1.25 \times 10^6$ sec. (14.5 days) | $2 \times 10^8$ sec. (6.4 years) | $0.25 \times 10^6$ sec (0.3 days) |
| $50 \times 10^{-9}$ (50 ppb) | Hi-Quality OCXO | ~$ 500 | $25 \times 10^3$ sec. (41.7 min) | $4 \times 10^5$ sec. (4.6 days) | $0.5 \times 10^3$ sec. (8 min) |

TABLE 1-continued

Relationship between frequency offset and interval between buffer overflow/underflow events

| Accuracy | Technology | Cost | 125-μsec slip | 20-msec slip | 25.25-μsec slip |
|---|---|---|---|---|---|
| $5 \times 10^{-6}$ (5 ppm) | OCXO | ~$50 | 25 sec. | $4 \times 10^3$ sec. (66.7 min) | 5 sec. |
| $50 \times 10^{-6}$ (50 ppm) | TCXO | ~$10 | 2.5 sec. | 20 sec. | 0.5 sec. |
| $1 \times 10^{-3}$ (0.1%) | XO | ~$ 1 | 0.125 sec. (8 per sec.) | 1 sec. | 0.025 sec. (40 per sec.) |
| $1 \times 10^{-2}$ (1%) | XO | ~$ 0.1 | 12.5 msec. (80 per sec.) | 0.1 sec. | 2.5 msec (400 per sec.) |

The perceptual degradation in quality caused by slips is very subjective. The impact of an isolated slip in conventional telephony using uncompressed signals (G.711) is typically a "click" that could well be imperceptible, especially if it occurs during a silent interval. However, the perceived quality degrades rapidly as the slip-rate increases. The various digital switches in the PSTN are all provided a PRS (Primary Reference Source) traceable reference and thus have an absolute accuracy of better than $1 \times 10^{-11}$. A call traversing two distinct timing domains may experience slips corresponding to a worst-case frequency difference of $2 \times 10^{-11}$. Considering that this equates to one slip every 72 days, we can, for all practical purposes, ignore the phenomenon of slips in the traditional circuit-switched network. In VoIP applications, the end points are quite cost sensitive and therefore it is likely that the quality of oscillator deployed will be represented by one of the last three rows of Table 1 and clearly slips may play an important role in determining the quality of experience (or lack thereof).

Most studies for evaluating the perceptual quality of compressed voice are done in a controlled environment and consider only a single compression/expansion. Additional study is required to assess the impact of tandem connections wherein there may be multiple conversions of format. Furthermore, the impact of an isolated slip may have a different perceptual effect on synthetic speech, such as that inherent in CELP (Code Excited Linear Prediction) methods for compression, such as G.729 (see Ref. [5]). However, it is quite well accepted that the controlled slip method, where one sample (octet) is deleted/inserted in an "uncompressed" stream, works very well provided that slips do not manifest themselves too often.

It is obvious that if the size of the buffer is large, then the relative frequency of occurrence of buffer overflow/underflow events will be small. However, large buffers imply the introduction of delay and the decrease in quality of experience. Nevertheless, even with large buffers deployed to mitigate the occurrence of buffer overflow/underflow, there are other impairments that arise because of a difference in clock between the end-points. These include the pitch modification effect and wow and flutter. These are not adequately addressed by present technology.

Delivery of constant-bit-rate services, such as DS1, over a packet network mandates that proper care be taken to ensure both bit-integrity and bit-time-integrity. The principles of clocking in circuit emulation applications is provided generically in ITU-T Recommendation Y.1413 in the form of four "architecture" options. In architectures #1 and #2, it is assumed that PRS-traceable clocks are available at the appropriate boundaries and the service clocks are derived therefrom and therefore the packet network is relieved of the responsibility of delivering timing information across the network.

Architecture #4 is a technique referred to as adaptive clock recovery. A theoretical analysis of adaptive clock recovery is provided to indicate the performance limitations of this technique. The conclusion is that adaptive clock recovery should not be used as the primary clock transfer mechanism unless there is no alternative available. However, the method has merit when used as an adjunct to architecture #2 or architecture #3.

Architecture #3 is the collection of methods that can be generically referred to as "encoding methods". It is assumed that a PRS-traceable clock is available at the ingress and egress inter-working functions where the "circuit-to-packet" and "packet-to-circuit" conversions take place. Information based on the behavior of the service clock relative to this "common" clock is encoded as a message at the ingress IWF and sent across the network to the egress IWF. The egress IWF can regenerate a "replica" of the service clock using this information and the "common" clock available. One example of encoding methods is SRTS (Synchronous Residual Time Stamp) as described in U.S. Pat. No. 5,260,978 (see Ref. [15]). In U.S. Pat. No. 6,111,878 (see Ref. [16]) a method for utilizing adaptive clock recovery as an adjunct to SRTS is described.

Whereas ITU-T Recommendation Y.1413 (see Ref. [14]) covers various aspects of circuit emulation, the intent here is to summarize the requirements related to synchronization and clocking. In particular, 4 strategies or "architectures" for delivering service clock are presented in Y.1413. These are described here.

Architecture #1: Service Clock Generated by Terminal Equipment

There are situations where clock information does not have to traverse the network. For example, as pointed out in Y.1413, the terminal (i.e. end-user) equipment may have access to "equivalent" clocks (time-base) at both ends. In this scenario, the IWF loop-times, utilizing the recovered clock from the incoming DS1 to generate its transmit clock for the return DS1 signal. Essentially, the network is relieved of the responsibility to carry clocking information over the packet cloud. The end-user clocks do not have to satisfy any stringent frequency accuracy criteria other than they must be equal at the end-points. The mechanism for achieving such equivalent clocks is not specified in Y.1413. FIG. 2a depicts Architecture #1. In this configuration the TDM network elements 201a are assumed to have independent sources of timing 202a that are coordinated such that the TDM clocks are synchronized (or plesiochronous). As shown in FIG. 2a, the most effective way to achieve this is to have G.811-traceable timing references available for the TDM network elements. The Inter-working Function (IWF) generates its TDM transmit clock from its incoming (receive) signal. That is, the IWFs "loop-time". Note that the packet network is relieved of the responsibility of transporting timing information across the network between the two IWFs. This is one of the recommended methods for providing circuit emulation service across a packet network. The size of the jitter buffer in the IWF must be commensurate with the expected time-delay-variation across the network to avoid data loss.

This architecture is appropriate when the packet network is interspersed between two TDM networks that are known to have good timing. If the end-user terminal is essentially customer-premises equipment, such as a PBX or T1 multiplexer, it is highly unlikely that PRS-traceability is available to the terminal equipment other than via the TDM link into the network.

Architecture #2: Service Clock Generated by Network

Another situation considered in Y.1413 where clock information does not have to traverse the network is similar to the one described earlier but has some subtle differences. This is when both the IWF devices have access to "equivalent" clocks (time-base) at both ends, generally a network clock traceable to a stratum-1 source. In this scenario, the "equivalence" is achieved by making both clocks accurate, typically to 1 part in $10^{11}$. In this scenario, the end-user equipment operates in a loop-time mode, utilizing the recovered clock from the incoming DS1 to generate its transmit clock for the return DS1 signal. The IWF uses the network clock for its outbound DS1. Here too, the network is relieved of the responsibility to carry clocking information over the packet cloud. This scenario is most appropriate when the end-user equipment is relying on the network for a time-base reference and is analogous to legacy schemes where the network end-points were devices, such as ⅙ digital cross-connects, that use a network timing reference for all transmit DS1s. There are other advantages of having an accurate, stable, reference at the IWF devices. It has been postulated that TDV across the network is minimized when the end-points have good synchronization. A low TDV allows a good compromise (trade-off) between latency and packet loss.

In this configuration the TDM network elements 201b are provided sources of timing 202b that are coordinated such that the TDM clocks are synchronized (or plesiochronous). As shown in FIG. 2b, the most effective way to achieve this is to have G.811-traceable timing references available for the IWF elements. The Inter-working Function (IWF) generates its TDM transmit clock from its local clock that is locked to a network timing reference. That is, the IWFs insert timing in a manner consistent with ITU-T Recommendation G.703 (the "centralized clock interface"). Note that the packet network is relieved of the responsibility of transporting timing information across the network between the two IWFs. This is the most highly recommended method for providing circuit emulation service across a packet network. The size of the jitter buffer in the IWF must be commensurate with the expected time-delay-variation across the network to avoid data loss.

Architecture #3: Encoded Methods

Then there are situations where the service clock is independent of the network clock. In these situations there is no alternative but to transfer the service clock over the packet infrastructure. However, even in this situation it is advantageous to have a network reference available at the IWF devices. An encoded version of the service clock, most easily visualized as the difference between the service clock and the network clock, at the T-IWF is transferred across the network as part of the information, allowing the R-IWF to recreate the service clock at the destination packet-circuit boundary. One example of this is the Synchronous Residual Time Stamp (SRTS) method suggested for ATM networks and described in [4].

The notion of SRTS that has been standardized as one means for transporting service clock over an ATM network (as in ATM Adaptation Layer 1 or AAL1) may well be extended to general packet networks as well. Encoding methods, such as SRTS, are considered for Architecture #3 in ITU-T Recommendation Y.1413 and shown in FIG. 2c. The principle of encoded methods is to transport a measure of the difference in service clock 202c and network reference, as established in the transmitting IWF 201c, across the network (as a message 203c appended to a packet or as part of the packet itself). The receiving IWF 204c can reconstruct the service clock using this measure of frequency difference in conjunction with its own network timing reference. Note that this mandates that both IWFs have a "common" timing reference, most advantageously obtained by providing each IWF with a G.811-traceable timing reference. The difference in service clock between the ingress and egress points will be directly related to the difference in network timing references at the two IWFs.

Architecture #4: Adaptive Clock Recovery

The fourth architecture described in ITU-T Y.1413 is the use of Adaptive Clock Recovery (or ACR). This is a best effort method and is unsuitable for transporting a network quality timing reference across the packet network. In Y.1413 adaptive clock recovery (ACR) is allowed for situations where there is no alternative but to transfer the service clock over the packet infrastructure. ACR is depicted in FIG. 2d, below. As shown in FIG. 2d, the service clock 202d for the transmit-out of the IWF on the right hand side is generated by adaptive clock recovery 203d. Just for simplicity, it is assumed that the TDM network element 201d on the left hand side is the "master" for the service clock.

With the exception of architecture #1, where the clock information does not have to transverse the network, offsets in the recovered clock at the receiving end will ensue. Adjustments of these offsets will require some kind of adaptive clock control.

Heretofore, the requirements of an adaptive play-out buffer and adaptive clock control referred to above have not been fully met. What is needed is a solution that solves all of these problems.

SUMMARY OF THE INVENTION

There is a need for the following embodiments of the invention. Of course, the invention is not limited to these embodiments.

According to an embodiment of the invention, a process comprises: writing a data packet into a jitter buffer at a write address specified by a write address generator; incrementing the write address generator; generating the difference between the write address and a current read address specified by a read address generator; reading a data packet from the jitter buffer from the current read address specified by the read address generator; generating a new read address based on the difference between the write address and the current read address by the read address generator.

According to another embodiment of the invention, a process of driving a numerically controlled oscillator comprises providing a local clock with a clock cycle; generating a numerical value during each clock cycle; adding the numerical value to an accumulator having a most significant bit; and using the value of the most significant bit as an oscillator.

According to another embodiment of the invention, an apparatus comprises: a jitter buffer; a write address generator for storing a write address; a read address generator for storing a current read address; a read address increment control; wherein the read address increment control sets the future read address based on the difference between the write address and the current read address.

According to another embodiment of the invention, an apparatus comprising a local clock with a clock cycle; a jitter buffer having a write address and a current read address; a first accumulator; a second accumulator having a most significant bit; an increment control; wherein the increment control sets an accumulation value to be added to the first accumulator based on the difference between the write address and the current read address; wherein the value of the second accumulator depends on the first accumulator; and wherein the most significant bit functions as an oscillator.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer conception of embodiments of the invention, and of the components combinable with, and operation of systems provided with, embodiments of the invention, will become more readily apparent by referring to the exemplary, and therefore nonlimiting, embodiments illustrated in the drawings, wherein identical reference numerals (if they occur in more than one view) designate the same elements. Embodiments of the invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1A:
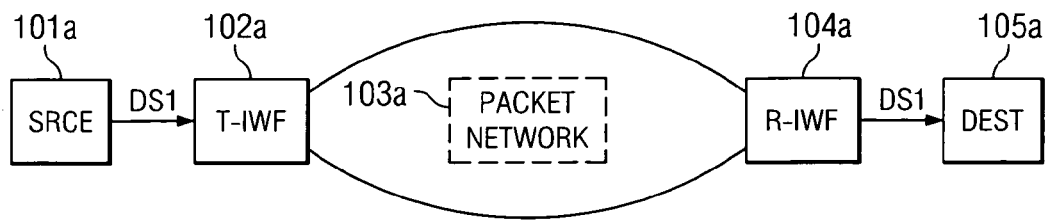
FIG. 1a shows a conventional VoIP network and is labeled "PRIOR ART."
Figure 1B:
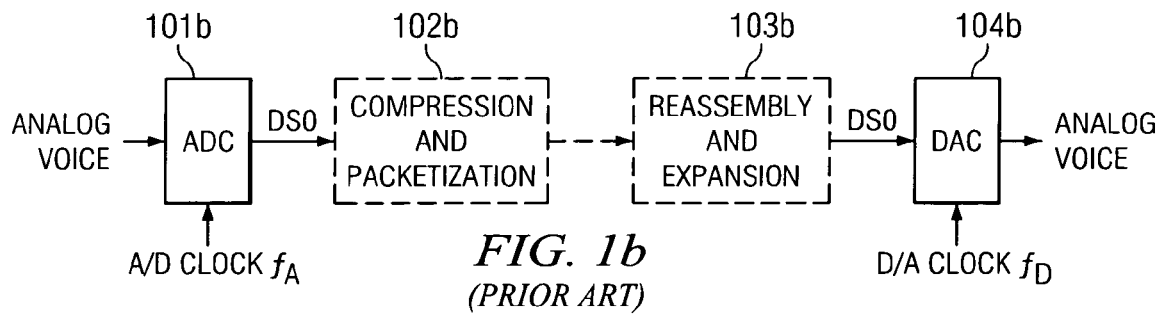
FIG. 1b shows the transporting legacy DS1 over a packet-switched network and is labeled "PRIOR ART."
Figure 2A:
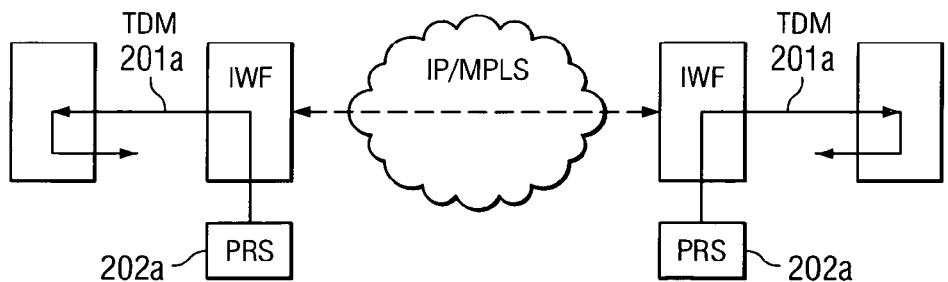
FIGS. 2a-2d illustrate architecture #144 defined in ITU-T Recommendation Y.1413 and are labeled "PRIOR ART."
Figure 2B:
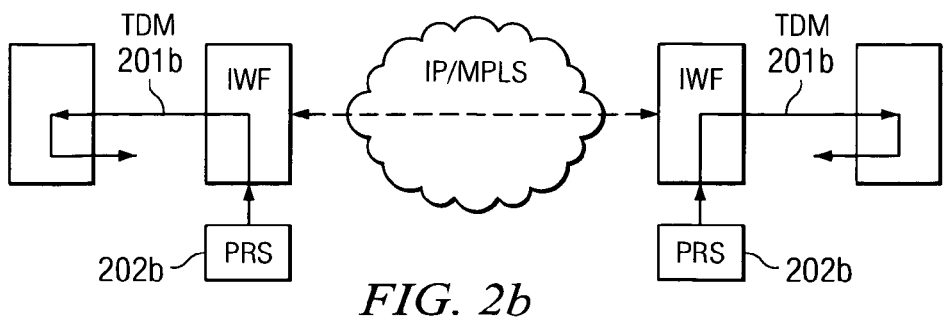
Figure 2C:
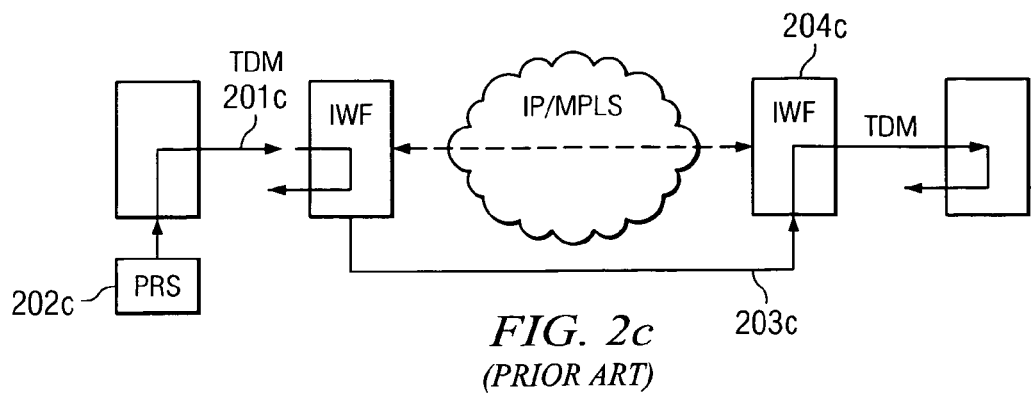
Figure 2D:
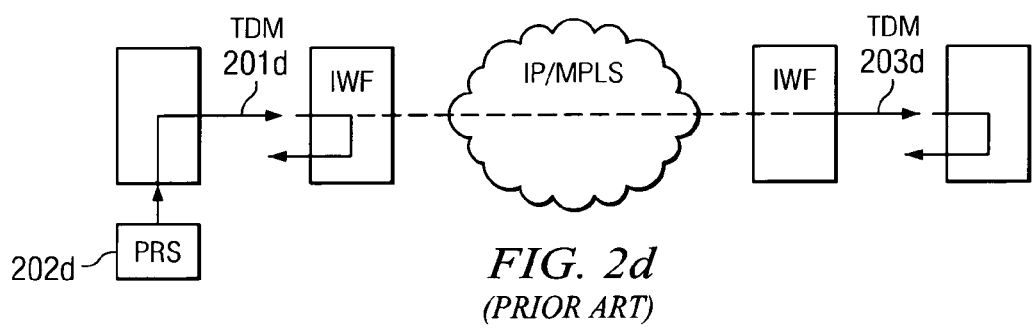

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced. Full citations for these, and other, publications may be found at the end of the specification immediately preceding the claims after the section heading References. The disclosures of all these publications in their entireties are hereby expressly incorporated by reference herein for the purpose of indicating the background of embodiments of the invention and illustrating the state of the art.

The invention described herein describes a novel approach to the play-out buffer, providing a method to maintain optimal performance even in situations where the analog-to-digital converter (ADC) and digital-to-analog converter (DAC) have different underlying time-bases. In particular, a method based on controlled slips, a technique that is well known as being efficient in TDM architectures for addressing clock offset, is presented. The invention is an extension of controlled slip behavior. In particular, the slip mechanism is invoked primarily when the speech segment represents a synthetic signal such as during periods of silence or if the characteristics of the speech segment are such that the repetition/deletion of a speech sample will have minimal subjective annoyance. It will be seen that an adaptive play-out buffer of the manner described here can form an integral part of an adaptive jitter buffer mechanism. Extensions of the invention include methods to implement adaptive clock control with minimal impact on subjective quality. In this approach, there is an implicit assumption that packets are delivered in sequence and that lost packets, which obviously are a source of data errors, are detected in time and synthetically inserted in order that clocking information is not affected.

One of the problems associated with communication of real-time information over packet networks is the time-delay variation introduced. A second problem is that the transport is asynchronous and therefore the receiving end may be operating at a different time-base from the sending end. The packetized nature of VoIP necessitates the use of a play-out buffer. The invention described herein deals with simple and efficient methods to address the play-out buffer and clock offset issues.

The salient points of the invention are:
1) The play-out buffer is made adaptive in the sense that controlled slips are implemented.
2) The signal-processing entity can flag samples from segments of speech that are considered "actionable".
3) The slip action can, optionally, be inhibited if the sample affected has been flagged as "nonactionable"
4) The controlled slip action is instantiated by monitoring the fill of the buffer.
5) The FIFO is implemented as a circular buffer and the difference between the read and write pointers used as a measure of buffer fill.
6) A timer is used to ensure that slip events do not occur too close to each other.
7) The buffer fill can be used to modify the write clock (adaptive clock operation) using a frequency control word.
8) The frequency control word is modified up or down by a small increment to adapt the play-out clock frequency. The modification is based on the buffer fill measure.
9) A timer is used to ensure that the frequency control is not too rapid.

Before describing the specific embodiments of the present invention, the pitch modification and pitch scaling effects will be described. It is well known in audio circles that having different record and playback speeds can produce some interesting effects. For example, recording at a low speed and playing back at a higher speed causes the pitch to increase, converting a "normal" human voice to sound squeaky (high-pitched). This effect has been used, for example, to create the voices of "chipmunks" in the popular cartoon series. Here we coin the phrase pitch modification effect (or "PME") to describe the phenomena related to a difference in the sampling rates of analog-to-digital (A/D) conversion and digital-to-analog (D/A) conversion. Audio engineers are well aware of PME. PME can be used to advantage to get the desired increase (or decrease) in pitch frequency though with the attendant effect of time compression (or expansion). However, the desired effect in audio processing is pitch scaling, where the duration of utterances is preserved. In fact, using digital signal processing techniques such as the Fast Fourier Transform (FFT), pitch scaling can be achieved quite effectively, though necessarily in a non-real-time environment, with the numerical computations performed on stored digitized audio signals for subsequent playback.

In a communications environment the situation is different because communication is necessarily real-time in nature. Furthermore, the clock rates of the A/D conversion and D/A conversion are nominally equal and the pitch modification effect is not anticipated. If one considers, for simplicity, one direction of transmission, as depicted in FIG. 1a, the entire network can be modeled as a pipe between the A/D 101a converter and the D/A converter 104a for the information bits generated by the digitalization of the (analog) signal.

The analog signal from the source enters the network and is converted into a digital signal by the analog-to-digital converter (ADC). The network acts as a pipe for these digital words (samples) that are delivered to the far-end digital-to-analog converter (DAC) for conversion back to analog. The conversion points could be in equipment, such as a customer-premise located IAD or PBX or even a Class-5 switch operated by the local telephone company. It is important to recognize that the time-base governing the A/D clock could be different from the time-base governing the D/A clock and thus there could be a difference in the sampling rates associated with these two conversions. That is, in every digital network there is the potential of encountering the pitch modification effect. The frequency difference could be small, of the order of 2 parts in $10^{11}$, if the conversion clocks are traceable to a Stratum-1 source (or sources); the frequency difference could be significant, of the order of 64 parts in $10^6$ (64 parts per million or 64 ppm), if the only guarantee given is that the conversion clocks are Stratum-4 quality (Stratum-4 implies an accuracy of no worse than ±32 ppm). {The notions of clock strata and the frequency accuracy of different classes of clocks are available in Ref. [6,7].}

Clearly, if the conversion rates are different, then the DAC will experience a surfeit of samples of the ADC clock is higher than the DAC clock, or a dearth of samples if the situation is reversed. In fact, such a phenomenon could be manifested at multiple places in the network where there is a connection between two Network Elements with different clock references. Clock offsets of this type are accommodated by the use of buffers. Whereas buffers are always required to compensate for accumulated jitter and wander, it is the effect of a frequency offset that is the primary focus here.

Again for simplicity, we shall assume that there is just one buffer, and that this buffer is associated with the DAC. This buffer will be of a FIFO (first-in-first-out) nature where the data is written into the buffer under control of the ADC clock and read out of the buffer under control of the DAC clock. Clearly, if there is a frequency offset between the two clocks, the buffer will, eventually, either overflow (ADC clock is higher) or underflow (DAC clock is higher). In practice the buffering method is called "double buffering" wherein there are two pages, say A and B, and while data is being written into page A, data is being read out of page B. If there is no frequency offset, then the opposite-page nature of read and write will, for the most part, be preserved. Such a buffer needs to be just big enough to accommodate any relative wander or jitter between the two clocks. It is convenient to describe the size of the buffer in terms of time. For example, if each page is "20 ms", then each page has 160 octets, assuming a nominal sampling rate of 8 kHz and one octet per sample (e.g. G.711; see Ref. [3] or [4]). The overall buffer is then 40 ms deep, introduces a nominal delay of 20 ms and can accommodate ±20 ms of wander.

Figure 3:
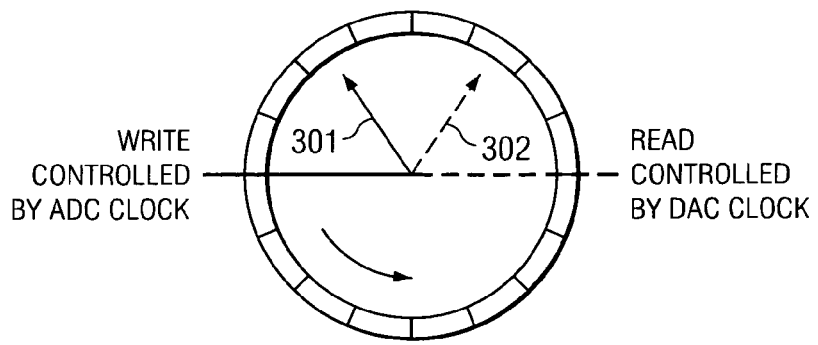
FIG. 3 shows a circular buffer view of the buffering action separating the ADC and DAC clocks, representing an embodiment of the invention.

A good way of visualizing the double-buffer action is to consider a circular buffer as depicted in FIG. 3. The memory is organized in a circular manner with address calculations done Modulo-2N, where 2N is the total number of memory locations. From the viewpoint of the DS0 channel under consideration, each location holds one octet (corresponding to one octet per sample), the buffer has a "length" of (2N/8) ms, introduces a nominal delay of (N/8) ms, and can accommodate ±(N/8) ms of wander. The operation is quite simple. With each write operation the write pointer 301 moves one location counter-clockwise and likewise the read pointer 302 moves one location counter-clockwise with each read operation. If the relative time error between the read and write clocks is zero, then the pointers 301 and 302 remain a fixed distance apart. A frequency offset will result in one pointer catching up to the other, resulting in an overflow/underflow. The reset position is when the pointers access diametrically opposite locations. When an overflow/underflow occurs, one pointer is forcibly moved to be diametrically opposite to the other. This action causes data corruption in the sense that N octets will be either lost or repeated.

One special case is when the buffer is 250 μs deep. This is the notion of a conventional slip buffer. Considering the sampling rate is 8 kHz (125 μs period), a slip buffer has two octets and the overflow/underflow results in either the deletion of an octet or the repetition of an octet. This is called a controlled slip. A slip occurs when the relative time interval error between read and write clocks exceeds 125 μs. For example, if the relative frequency offset between the two clocks is 64 ppm, then a slip will occur approximately every 2 seconds. Considering that slips are significant transmission impairments, the pitch modification effect will be swamped by the impact of slips.

Now suppose that the buffer is 200 ms deep. The buffer will overflow (underflow) when the relative time interval error between the two clocks exceeds 100 ms. A 64 ppm offset will thus result in overflows (underflows) approximately every 3000 seconds. Considering that a telephone call rarely lasts 50 minutes, it is clear that overflows (underflows) may be ignored for all practical purposes. However, the pitch modification effect remains, and is not masked as it would be with a conventional 250 μs slip buffer.

It is somewhat unfortunate that the deleterious effects of frequency offset have traditionally been viewed primarily in terms of slips. If the only concern was buffer overflow (underflow) then providing large buffers provides the false comfort of overflow (underflow) elimination, an argument often used to justify the statement that IP Networks "do not need synchronization". It is disconcerting that such a limited viewpoint of synchronization has been applied in several NGNs currently deployed where the pitch modification effect has been observed, if not identified, the symptoms being the malfunction of "older Fax machines". Whereas the pitch modification effect may be catastrophic for voice-band (modem) signals, the effect on regular human-to-human voice communication is much less severe because of the natural tolerance of the human auditory system.

Figure 4:
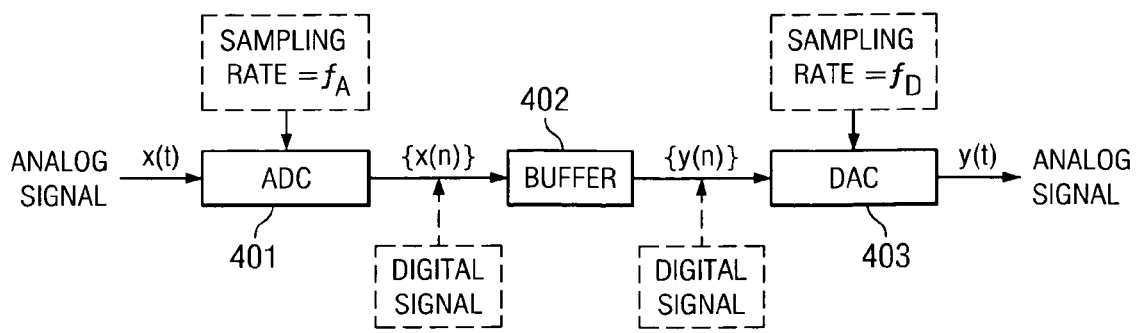
FIG. 4 shows the DSP viewpoint of the pitch modification effect, representing an embodiment of the invention.

We will now describe the Pitch Modification Effect as it occurs in the Fourier Frequency Domain. The principles of Digital Signal Processing ("DSP") or, more correctly, Discrete-time Signal Processing (also "DSP") can be used to illustrate the theoretical underpinnings of the pitch modification effect. In particular, consider the situation depicted in FIG. 4. The analog signal, x(t), is converted into digital format by the A/D converter (ADC) 401 with the underlying sampling rate of $f_A$. Since the impact of sampling rate difference is of interest here, we shall assume that the ADC is ideal and introduces no quantization error. Furthermore, we assume that x(t) is band-limited so that aliasing effects are of no concern. The ADC thus converts the analog signal, x(t), into the discrete-time sequence {x(n)}. The notion of the buffer 402 in FIG. 4 is solely to indicate a demarcation between the A/D conversion and D/A conversion processes. Assuming that there are no overflows (underflows), it follows that the discrete-time signal, {y(n)}, is identical to {x(n)} except for a delay. The digital-to-analog conversion is also assumed to be ideal (no quantization impairment) and followed by an ideal low-pass filter that eliminates all spectrum replicates. The sampling rate underlying the conversion from digital to analog is $f_D$, which is nominally equal to $f_A$. {See Ref. [4] for a comprehensive treatment of A/D and D/A conversion}.

The assumption that there is no information corruption in the network is equivalent to saying that the digital signal (sequence) {x(n)} and {y(n)} are equal, except for a delay. Assuming the converters are ideal, the only reason why y(t) is substantively different from x(t) is because there is a difference between the sampling rates $f_A$ and $f_D$. In the frequency domain, the Fourier transforms of x(t) and y(t) are given by $$X(f) = \sum_n x(n) e^{-j2\pi f T_A}; \quad Y(f) = \sum_n y(n) e^{-j2\pi f T_D} \quad \text{(Eq. 1)}$$

where $T_A$ and $T_D$ represent the sampling intervals associated with the ADC and DAC, respectively (the sampling interval is the reciprocal of the sampling rate). Since the sequences {x(n)} and {y(n)} are substantively equal, it follows that $$Y(f) = X\left(\left(\frac{T_D}{T_A}\right) f\right) = X\left(\left(\frac{f_A}{f_D}\right) f\right) \quad \text{(Eq. 2)}$$

In other words, there is a stretching of the spectrum. For example, a periodic signal component of x(t) with period, say, $T_0$ and corresponding fundamental frequency $f_0$ (reciprocal of $T_0$), will appear in y(t) as a periodic signal with period $T_1$ and corresponding fundamental frequency $f_1$, where $T_0$ and $T_1$ ($f_0$ and $f_1$) are related by $$T_1 = \left(\frac{T_D}{T_A}\right) \cdot T_0; \quad f_1 = \left(\frac{f_D}{f_A}\right) \cdot f_0 \quad \text{(Eq. 3)}$$

This time compression (expansion) and frequency scaling is the pitch modification effect. When the frequency offset is of the order of a few parts per million, the impact of speech communication will be indiscernible to a normal human being. The impact on machines, such as Fax machines, may not be so benign. In particular, the pitch modification effect alters the symbol rate of transmission that could in turn have numerous deleterious effects. For instance, the machines may "synch up" at a lower bit-rate or not "synch up" at all. The offset can be quantified most simply in terms of a fractional frequency difference, Δf, (or, equivalently, a fractional time interval difference, ΔT). Assuming that the offset is small, the following equations are valid.

$$\Delta T = \quad \text{(Eq. 4)}$$
$$\Delta f = \frac{f_D - f_A}{f_A} \left( \cong \frac{f_D - f_A}{f_D} \right) \left( \cong \frac{T_A - T_D}{T_A} \right) \left( \cong \frac{T_A - T_D}{T_D} \right)$$

If the symbol rate of transmission of the transmitting Fax machine is $S_A$, then the effective symbol rate as perceived by the receiving Fax machine is $S_D$, where $$S_D = S_{A'} \cdot (1+\Delta f)[= S_{A'} \cdot (1+\Delta T)] \quad \text{(Eq. 5)}$$

and it is seen that the frequency offset translates directly into an alteration of symbol rate. Since the symbol rate is the mechanism by which the transmitter conveys time-base information to the receiver, and there are reasonably tight bounds on the requisite accuracy of this time-base transfer, the frequency offset could be the difference between being "in-spec" and "out-of-spec".

Whereas a simple (and small) frequency offset may be tolerable to the human ear, variations are much less tolerable. The constant frequency offset between ADC clock and DAC clock can be modeled mathematically as shown in Eq. (1-5). However, even if the two clocks have the same frequency when viewed on a long-term basis, short-term variations, primarily wander, do introduce impairments. One such impairment is wow and flutter. This effect is more difficult to model mathematically. The effect is actually well known and most people have observed it. For example, when playing back recorded music on a tape deck, if the speed of the tape crossing the playback head is constant but not equal to the nominal value (the speed of the tape at the time of recording), the resulting impairment is the pitch modification effect; if the speed is not constant the resulting impairment is wow and flutter. An appropriate mathematical model will be based on frequency modulation; colloquially the effect can be described as an oscillatory variation in pitch.

Figure 5:
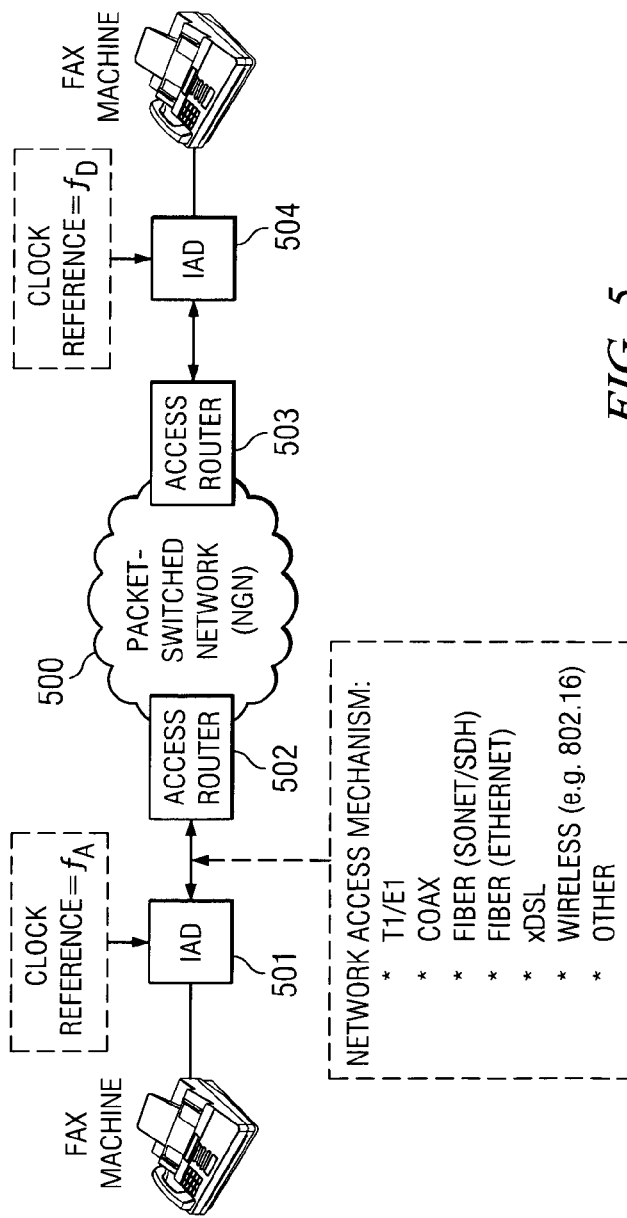
FIG. 5 shows a simplified model of a VoIP over an IP network, representing an embodiment of the invention.

A simplified model for a Next Generation Network (VoIP Environment) will now be presented. A network based on packet switching and transmission can be quite complex, but the simple model depicted in FIG. 5 is sufficient to illustrate how synchronization and adaptive play-out buffers play a role. We consider an IAD (Integrated Access Device) 501 at the customer premises as the traffic aggregator. All the various services are provided from the IAD to which all the customer equipment is connected. To allow for attachment of legacy devices such as telephones and Fax machines, the IAD will provide an FXS port to which the Fax machine (telephone) is connected. To the Fax machine (telephone), the FXS port appears, for all intents and purposes, as the line circuit of a traditional Class-5 switch. The IAD contains the codec where the conversion between analog and digital is accomplished. The information, however, is not transported as a conventional DS0 would in a TDM (time division multiplexed) or circuit-switched scenario. The data is packetized and encapsulated in the appropriate "wrappers" for transmission over the packet network, through the use of an access router 502. The data is transmitted over the packet-switched network 500 to the destination router 503, whereupon it is decoded and sent to the destination IAD 504.

Figure 6:
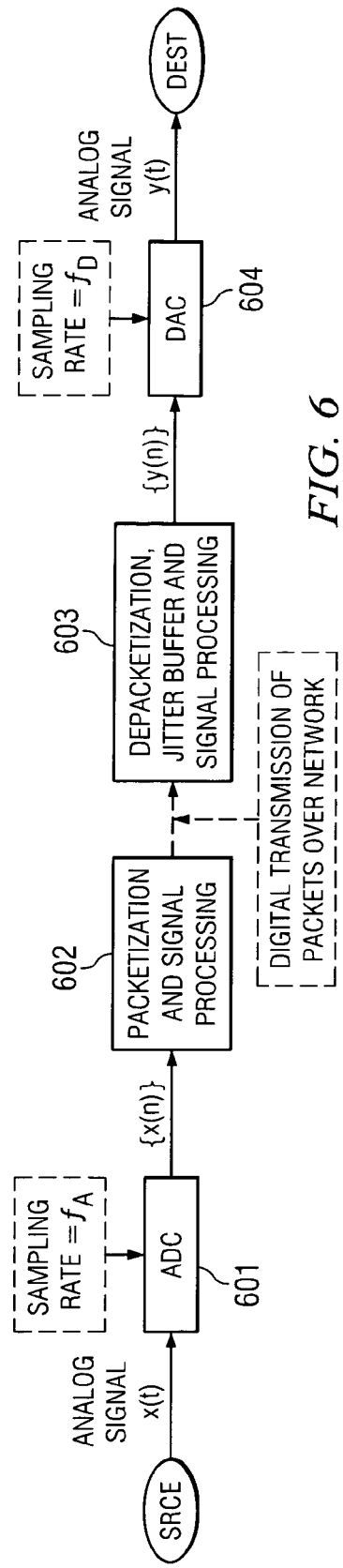
FIG. 6 shows the transmission of voice-band signals over a packet network, representing an embodiment of the invention.

In terms of the important processes involved after call set-up, a simple, though accurate, view is depicted in FIG. 6. For convenience only one direction of transmission is shown. The analog signal from the source Fax machine or telephone ("srce") is converted into digital format using an A/D converter 601. It is quite conventional to use a conventional telephony codec that uses a sampling rate of 8 kHz and encodes the sample value in an octet (G.711 coding) though there are implementations described in the literature where a higher sampling rate and a higher word-length are used for improved fidelity. These samples are assembled into packets. For speech applications there may be some signal processing 602 involved for purposes of echo cancellation and data compression; for Fax calls the samples are generally used without modification. The packets are delivered to the destination by the packet network. At the destination, depacketization, buffering, signal processing is performed as shown in the block 603. The data is then sent to the DAC converter 604.

Speech implementations also allow for voice activity detection (VAD) whereby intervals of silence are detected and transmission bandwidth conserved by just transmitting an indication of silence rather than (encoded) speech sample information. At the receiving end intervals of silence are synthesized using comfort noise.

Whereas packet architectures are superior to circuit-switched architectures in terms of efficiency of bandwidth utilization (because of statistical multiplexing), they have some drawbacks, comparatively speaking. Packet architectures tend to increase latency (average delay) and introduce time delay variations. In order to accommodate time delay variations, jitter buffers are required and the depth of these buffers must be large enough to span the peak-to-peak time delay variation over the network.

If the jitter buffer is too small, time delay variation can be the cause of packet loss. For normal voice (speech) calls, packet loss concealment ("PLC") algorithms are available to mitigate the impact of lost packets. However, PLC methods are of no use in calls between voice-band modems (Fax machines). In these cases a lost packet results in transmission errors that could, if they occur at the wrong time, take the connection down. However, buffers introduce delay, causing a negative impact on the Quality of Experience for voice calls for several reasons (see Ref. [8]). Consequently most VoIP implementations introduce a large buffer, often as big as 200 ms, at the beginning of the call. If the signals are from a voice-band modem (Fax machine), as identified by the 2100 Hz preamble, the buffers remain at the maximum size. For voice calls, algorithms have been developed to make the jitter buffer size dynamic, keeping the buffer just large enough such that the loss of packets due to time delay variation is within an acceptable limit, which the ITU-T Recommendations specify as 0.05%.

With the jitter buffer set at its maximum size, and providing adequate traffic engineering is in place to provide the real-time services (such as VOIP) the appropriate priority, it is assumed that time delay variation will not cause packet loss except in situations of high traffic congestion. However, the frequency offset between source and destination has two deleterious effects. One is the pitch modification effect that has been described above, and the other is a "buffer shrink" effect. If the DAC clock is faster than the ADC clock, the jitter buffer will empty faster than it is being filled. Whereas at the start of the call a 200 ms buffer will, theoretically, allow a ±100 ms time delay variation, the emptying of the buffer will affect the lower threshold. Similarly, if the ADC clock is faster than the DAC clock, the buffer will fill faster than it is being emptied and this will affect the upper threshold. For example, a frequency difference of 50 ppm will cause a threshold reduction (either the upper or the lower) of 50 μsec every second or 1 ms every 20 seconds. Therefore, whereas the probability of losing a packet due to time delay variation may have been small to nonexistent at the start of the call, the probability increases with the duration of the call and, for calls of long duration could become appreciable.

Providing large buffers may "eliminate" overflows (underflows) due to the frequency offset, but buffers do have other issues. In particular, there is an increase in transmission delay. This may affect the handshake procedures between the Fax machines. Whereas a single IP hop may not be problematic, if the overall path between the Fax machines has several hops with IP segments interspersed with circuit-switched segments, then the accumulated delay could be substantial. Even if not large enough to cause time-out problems, the round-trip delay could add to the duration of the call and the increase could be quite substantial if the facsimile transmission involves multiple pages. For voice calls the delay, especially when echo problems exist, may be such as to have a very negative impact on end-user quality of experience.

For voice calls there have been several methods described in the literature to handle such problems. The notion of an adaptive jitter buffer is to modify the size of the jitter buffer to match the existing time-delay variation condition being experienced. Silence-stretching and silence-compressing algorithms have been proposed to delete or expand sections (sub-intervals) of silence. Packet loss concealment algorithms have been developed to insert or delete sections of "non-silence" in such a manner as to reduce (subjectively) any annoying effects of packet loss. The interested reader is pointed to Ref [9, 10] for further information on these methods.

In the context of this invention, silence-manipulation and packet loss concealment will be designated as extreme measures. Such measures are necessary because the general behaviour of IP networks is such that packets will be lost in the network for a variety of reasons, including excessive time-delay variation that could lead to jitter buffer overflow or underflow. In the context of this invention, the block 603 labeled "Depacketization, Jitter Buffer, and Signal Processing" in FIG. 6 will be, logically, split into multiple entities:

a. Depacketization. The packets received from the IP network are processed and the information content required to generate the speech signal extracted. As part of the depacketization process, the protocol wrappers are examined to detect whether a packet was lost in the network. If a packet is detected as "lost", then the packet loss concealment algorithm is invoked. The current invention does not relate in particular to depacketization algorithms and implementations and just about any methods prevalent in the state-of-the-art can be employed.

b. Signal Processing. The information extracted from the received packet is processed with the appropriate algorithms to generate the speech segment. This includes the codec function, echo treatment (if any), comfort noise generation to synthesize silence, and packet loss concealment. The current invention does not relate in particular to the signal processing algorithms and implementation and just about any methods prevalent in the state-of-the-art can be employed. There is one additional (though optional) requirement on the signal processing implementation arising from the current invention. That is, a flag is associated with each sample (octet) of speech signal recreated/synthesized. This flag is asserted ("true") if the speech sample generated was part of a silence segment or a segment of signal artificially created via the packet loss concealment algorithm or had some particular characteristic as will be described later. The intent in this flag is to indicate that the sample is "actionable" and will have a minimal subjective annoyance in the event that the sample was deleted/repeated as part of the adaptive play-out buffer that is the crux of the invention disclosed herein. If the signal processing entity is incapable of providing such a flag for any reason, then the play-out buffer will, in essence, ignore the flag and assume that all samples are "actionable".

c. Jitter Buffer. The jitter buffer in prior art VoIP decoders comprised a first-in first-out (FIFO) buffer that was large enough to accommodate the time delay variation encountered by packets as they traverse the IP network from source (encoder/packetization) to the destination decoder. In one possible implementation, the incoming packets are written in as they arrive and read out by the signal processing entity at the play-out rate. That is, the jitter buffer contains the actual received packets with, possibly, the protocol wrappers removed. In a second implementation, the incoming packets are treated by the signal processing entity as they arrive and the synthesized speech samples written into the FIFO. In this second implementation the FIFO contains actual speech samples destined for the DAC and is emptied based on the clock of the DAC. The invention disclosed herein assumes this second mode of operation.

The invention disclosed here deals with an adaptive play-out buffer. This is described below by considering the fundamentals of prior-art and the extensions that comprise the invention.

In all circuit emulation schemes, the information from the incoming packets is extracted and written into a FIFO (first-in-first-out) buffer. The data is read out from the FIFO using the chosen DS1 output clock. Depending on the architecture this would be either the end-user derived clock as in Architecture #1; a network-derived clock as in Architecture #2; a regenerated clock as in Architecture #3; or a best-effort clock derived using adaptive clock recovery as in Architecture #4. The FIFO performs the function of a "jitter buffer" to absorb time-delay variations encountered by the packets as they transit the packet network.

The underlying principle of retiming is quite straightforward. The play-out buffer can be basically viewed as a retimer as described here. The underlying principle of retiming is quite straightforward. Fundamentally, the data (speech samples or octets) as well as a clock ("recovered clock") are recovered from the incoming packet stream. Essentially, as a packet arrives, the signal processing entity performs the necessary signal processing to generate the digital sequence that will, eventually, be converted into analog by the DAC. The "recovered clock" is used to write the digital sequence into a buffer that is operated in a FIFO ("first-in-first-out") mode. The recovered clock in this scenario is a burst mode clock that will generate the right number of "write pulses" to transfer the (typically 160 samples corresponding to a 20 ms block of speech at an 8 kHz sampling rate). The data is read out of the buffer using the DAC clock or the chosen DS1 clock, typically 8 kHz (the retiming function generally involves inserting the "reference" clock), and then samples read out from the FIFO can be applied to the DAC or the output interface unit (LIU). The LIU clock is the same as the regenerated DS1 clock. The function of "retiming" is illustrated in FIG. 7.

Figure 7:
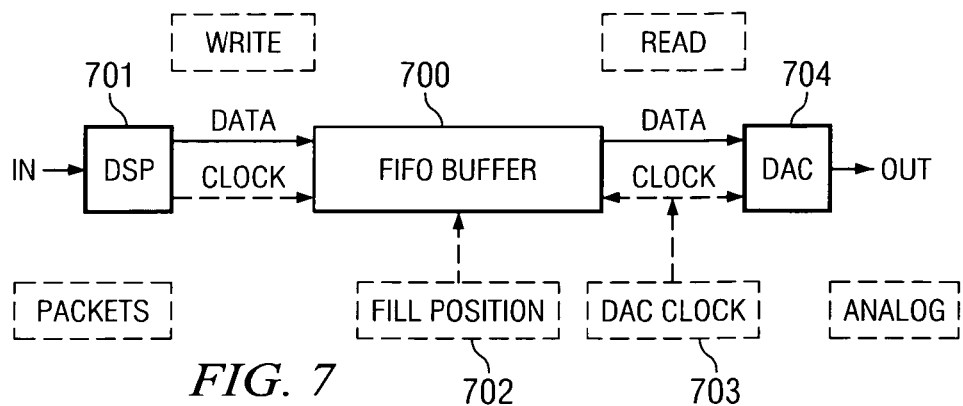
FIG. 7 shows the underlying principle of a retiming FIFO buffer (play-out buffer), representing an embodiment of the invention.

In FIG. 7, the block 701 labeled DSP refers to the circuitry used to implement the depacketization and digital signal processing functions. On the "input" side (the left hand side of FIG. 7) the DSP converts the received packets into speech samples. On the "output" side (the right hand side of FIG. 7) the DAC 704 converts the digital signal comprising the speech samples into analog format (or the LIU converts the signal into standard DS1 signal (analog)).

For illustrative purposes, the FIFO 700 can be viewed as a "pipe" with the receive data that is written into the FIFO viewed as being pushed into the pipe. The transmit data that is read out of the FIFO is viewed as being pulled out of the pipe. The arrow designated as "fill position" 702 indicates where the next sample (octet) that must be read out is located within the pipe. The action of "write" moves the fill position 702 to the right and each read operation moves the fill position to the left. At the beginning or "reset" situation, the fill position 702, arbitrarily, points to the middle of the FIFO buffer. With such an arrangement, if the size of the FIFO buffer is 2N units (typically octets), short-term frequency variations, referred to as wander, can be accommodated without loss of data. In particular, up to N unit intervals ("UI") of wander amplitude (2N UI, peak-to-peak) can be absorbed (1 UI is equivalent to 1 sample-time, 125 µs if the underlying sample rate is 8 kHz). Needless to say, the arrangement adds transmission delay of, on the average, N UI. A FIFO of this nature can serve as a jitter buffer accommodating up to ±N UI of time-delay variation. For reference, if N is 128, up to ±16 ms of time-delay variation (wander) can be absorbed.

One of the advantages in deploying the play-out buffer post-signal-processing is that the size of the buffer can be made a parameter and be well suited for implementation. The size of the buffer in this situation is decoupled from the size of the packets used in the IP network. Furthermore, the granularity of jitter buffer size achievable is finer than one packet size unit.

If the (long-term) average frequencies of the write clock and read clock are different, then the buffer will either overflow or underflow. With respect to FIG. 7, the fill position 702 will move all the way to the right if the write clock is high or all the way to the left if the write clock is low. In this situation data will be corrupted; either some data is lost ("overflow"), or some "garbage" data must be inserted ("underflow"). In a generic retiming application, the appropriate way to handle such frequency offsets is to force the fill position to the center (the equivalent of "reset") whenever the fill position rails at either extreme. In such a situation, either N octets are discarded ("lost") or N octets are repeated ("garbage"). In a VoIP, where the signal processing entity is capable of packet loss concealment, the advent of underflow can be anticipated and instead of "garbage", speech segments can be synthesized that have much less subjective annoyance. Likewise, the advent of overflow can be detected and packet loss concealment methods applied to "delete" packets in a manner that is not arbitrary but introduces less impairment from a subjective standpoint. In a circuit emulation scenario, where the signal processing entity is capable of packet loss detection, it is advisable that the DSP insert "null" data (i.e. "garbage" data) just so that the fill position of the FIFO is reflective of the relative frequency offset between read and write clocks. One key element of the disclosed invention is the anticipation of overflow/underflow events. This will be described shortly.

The double buffer arrangement for implementing the FIFO function will now be described. The most common arrangement for implementing the FIFO function involves the use of two buffers of equal size, say N octets, and referred to as "A" and "B". One of the sides (we shall assume the "write" side for specificity and ease of explanation) accesses the buffer(s) sequentially. That is, the write operation first fills buffer A, moves to buffer B, fills it, and returns to filling buffer A. The read operation empties the buffers. Under "normal" conditions, the read side is accessing buffer B while the write side is accessing buffer A, and vice-versa. If the average (long-term) frequencies of the read and write operations are equal, then the accesses will, substantially, remain in opposite buffers. The double buffer viewpoint of the FIFO is depicted in FIG. 8.

Figure 8:
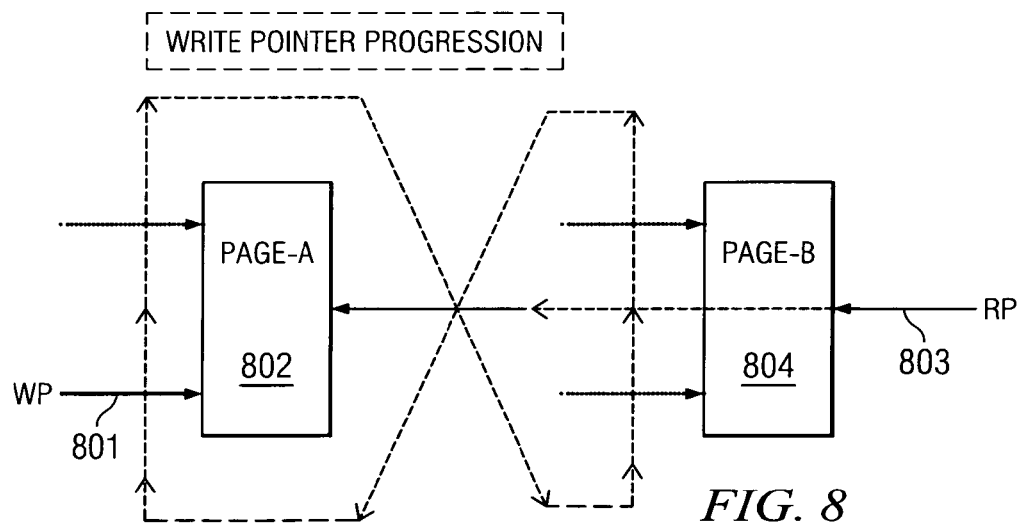
FIG. 8 shows a Double Buffer Arrangement for a FIFO buffer, representing an embodiment of the invention.

In FIG. 8 a simplified depiction of a double buffer arrangement for implementing the retiming FIFO is provided. More often than not, the buffer is implemented using a Dual-Port-RAM (or DPR, where RAM denotes Random Access Memory). The two buffers are often referred to as Page-A (802) and Page-B (804). The trajectory of the write pointer ("WP") (the address to which the next write operation will pertain to) is shown as 801. In particular, after filling Page-A, the pointer moves to the bottom of Page-B and commences filling Page-B. The trajectory of the read pointer ("RP") 803 follows the same principle and is implied. At the beginning (or "reset"), the WP and RP point to different pages.

If the (long-term) average frequencies of the write and read actions is different, then there will come a point in time when the WP 801 and RP 802 point to the same location in the same page. The action taken at that point is to force the RP 803 to the same location in the opposite page (this is indicated in FIG. 8). Alternatively the WP 801 pointer could be forced to the opposite page. The net result of this action is to "center" the fill position and the impact on the data is either the loss of N octets ("overflow") or the repetition of N octets ("underflow"). Absent this "buffer dump/repeat", the arrangement can accommodate up to N UI (peak) of wander amplitude. Needless to say, the larger the buffer the more deviation can be absorbed but this is at the cost of increased transmission delay.

Implications of ITU-T Rec. G.824 and ANSI T1.403

The output of the IWF must satisfy the jitter and wander requirements of ITU-T

Figure 9:
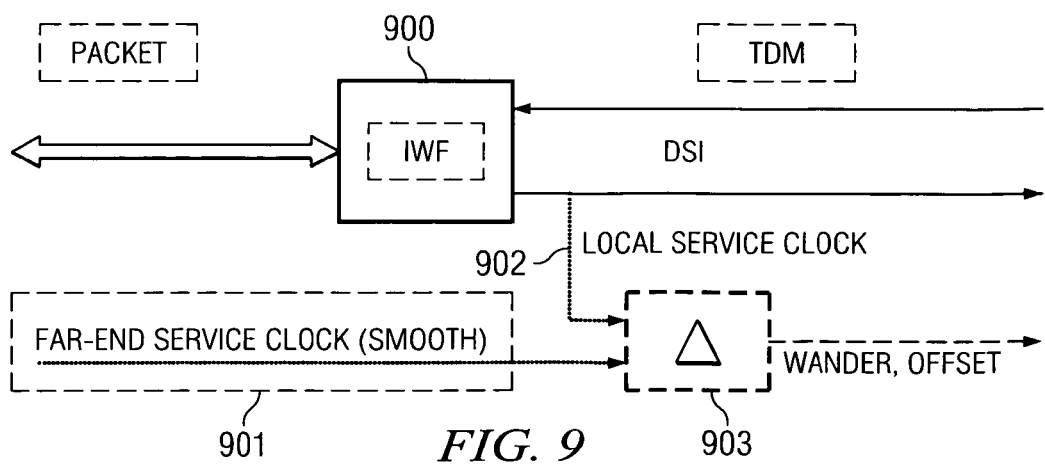
FIG. 9 shows the underlying model for interpreting G.824 (T1.403) applied to circuit emulation of DS1 over a packet network, representing an embodiment of the invention.

Recommendation G.824 (Ref. [13]) and ANSI T1.403 (Ref. [21]) at the DS1 interface. Most DS1 Line Interface Units (LIUs) provide for jitter reduction and consequently meeting the jitter mask of ITU-T G.824 or ANSI T1.403 should not be a major issue; meeting the wander mask of G.824 (and T1.403) is somewhat more problematic and deserves attention. FIG. 9 indicates the basis for the specification of wander and frequency offset in the inter-working function IWF 900. The underlying clock 902 is compared (903) with a suitable reference, typically an idealized (smooth) version of the far-end service clock 901. Alternatively, the reference could be a G.811-traceable clock with negligible clock noise components. The wander limit (MTIE mask) provided in G.824 is given by:

$MTIE(\tau) < 8.4 \mu s (13 \ UI)$ for $\tau < 900$ s $MTIE(\tau) < 18 \mu s (28 \ UI)$ for $900 s < \tau < 86400$ s It is instructive to see what levels of frequency offset, drift, and sinusoidal wander would violate the MTIE mask:

A 15-minute frequency offset of greater than (approximately) $9.3 \times 10^9$ (9.3 ppb) introduces ~8.4 ps of time offset in 15 min. (900 s).

A 24-hour frequency offset of greater than (approximately) $21 \times 10^{-11}$ introduces ~18 µs in 86400 s (24 h).

A sustained drift of ~0.021 ppb/s introduces ~8.4 ps of time offset in 15 min. (900 s).

A sinusoidal wander component with underlying Fourier frequency greater than ~1.1 mHz must have an amplitude of <4.2 µs (peak) (8.4 µs p-to-p). The highest Fourier frequency associated with wander is 10 Hz.

A sinusoidal wander component with underlying Fourier frequency less than ~1.1 mHz must have an amplitude of <9 µs (peak) (18 µs p-to-p).

A sinusoidal wander component with Fourier frequency $f_W$ Hz and amplitude $W_T$ □S introduces a time-varying (sinusoidal) frequency offset with amplitude $2\pi f_W W_T$ ppm and sinusoidal drift with amplitude $(2\pi f_W)^2 W_T$ ppm/s.

Considering that the largest wander component frequency is 10 Hz, it is possible to have a sinusoidal wander component that meets the G.824 requirement of 4.2 ps amplitude but introduces a peak frequency offset of 264 ppm. This implies that for certain applications, such as delivery of DS1 to a wireless base-station, where the maximum permissible frequency offset is 50 ppb, the 4.2 ps amplitude limit for a sinusoidal wander component may be appropriate only if the frequency is restricted to about 1.89 mHz or less.

Adaptive Clock Recovery—An Analysis

A fundamental premise underlying adaptive clock recovery is that the constant-bit-rate service, such as DS1, has a stable clock and that the T-IWF utilizes this stable clock to establish the rate at which packets are launched. Thus for DS1 the nominal bit-rate is 1.544 Mbps and, assuming that the T-IWF assembles N information octets in each packet, the nominal packet rate is $f_A \approx [1544/(8N)]$ kHz. In the absence of time-delay-variation, the packet rate of reception will be (nominally) constant and equal to the transmit packet rate, a characteristic associated with circuit-switched networks. In any packet-switched network, the transit time of a packet is, essentially, random and the arrival rate will be time-varying and "equal" to the transmit rate only in the sense of a (very) long-term average. The notion of adaptive clock recovery is that the R-IWF can recreate the service clock by filtering the arrival rate. In this section we quantify the efficacy of the filtering process by ascertaining the residual jitter, wander, and short-term-frequency offset that remains post-filtering.

Figure 10:
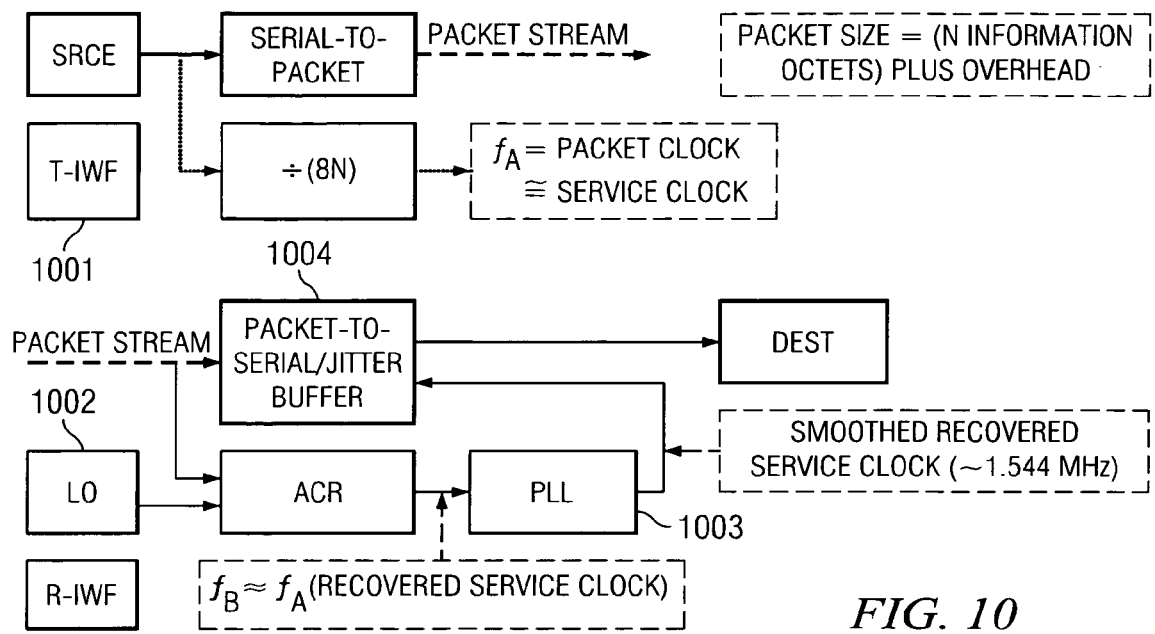
FIG. 10 shows the primary functions of the inter-working-function (IWF), representing an embodiment of the invention.

A simplified view of the primary functions of the IWF is depicted in FIG. 10. The T-IWF 1001 generates the packets that are launched over the packet cloud and received at the R-IWF. The adaptive clock recovery (ACR) function utilizes the arrival times of the packets, or, more typically, the first difference thereof which represents the instantaneous packet rate, and implements a smoothing function, aided by a (possibly high-performance) local oscillator (designated by "LO" 702 in FIG. 1002) to recreate the recovered service clock, $f_B$ ($\approx f_A$). The filtering is achieved either by a phase locked loop (PLL) 1003 or a frequency locked loop (FLL) arrangement. A second (phase locked) loop, designated as "PLL" in FIG. 10, is used to up-convert the recovered service clock to the requisite frequency, 1.544 MHz in the case of DS1, that can be used to clock the serial data out in the form of a conventional (e.g. DS1) signal. The conversion from packet to serial format (1004), as shown in FIG. 10, is meant to include the jitter buffer to account for time-delay variation over the packet network. It is, in essence, a first-in-first-out (FIFO) buffer under the assumption that the network delivers packets in sequence.

Modeling Adaptive Clock Recovery

Figure 11:
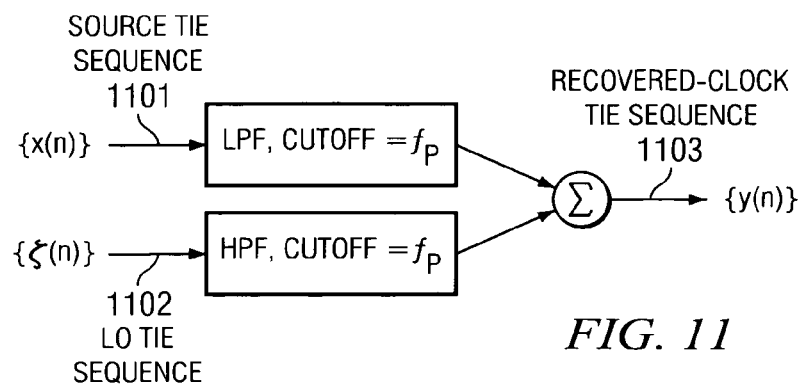
FIG. 11 shows the filtering view of the adaptive clock recovery (ACR) loop function, representing an embodiment of the invention.

Ignoring any flat (i.e. constant) delay in the network, the arrival time epochs will line up with the epochs of the transmit packet clock, $f_A$, in the absence of any time-delay variation. Thus the TDV can be modeled in terms of a Time Interval Error (TIE) sequence (see Ref. [6], for example), $\{x(n)\}$, where $x(n)$ represents the delta between the actual arrival time and the ideal arrival time of the n-th packet. $\{x(n)\}$ can be viewed as a discrete-time signal (i.e. sequence) corresponding to the samples of a signal $x(t)$ taken at a sampling rate of $f_A$. This is termed the source TIE sequence that is filtered by the phase-/frequency-locked loop. The loop is essentially a low-pass filter for the source TIE sequence and a high-pass filter for the clock noise originating in the local oscillator. Thus the filtering action of the loop can be modeled as in FIG. 11, which shows how the source TIE 1101 and the LO TIE (local oscillator contribution) 1102 both contribute to the TIE of the recovered clock 1103, designated as $\{y(n)\}$. The filter cutoff frequency is designated by $f_p$.

In order to derive closed form expressions for the metrics of interest, certain simplifying assumptions have to be made. These are outlined below.

The source TIE sequence is a random process with flat power spectrum. That is, the sequence is assumed to be "white", with power spectral density, $S_x(f)$, constant over the relevant Fourier-frequency range of $[-0.5\, f_A, +0.5\, f_A]$. This is, potentially, a very optimistic assumption.

The amplitude distribution is modeled by a uniform probability density function (pdf) with zero mean. This assumption is solely for convenience and is somewhat pessimistic. If $\Delta_{pp}$ is the peak-to-peak time-delay-variation, then all values between $-0.5\,\Delta_{pp}$ and $+0.5\,\Delta_{pp}$ are equally likely. Assuming that the TDV has a well defined range of probable values, $\Delta_{pp}$, the standard deviation, $\delta_x$, will be of the form $g\Delta_{pp}$ where g is some constant. The uniform pdf assumption implies that this constant is $\sqrt{(1/12)}$.

The filter frequency response characteristic is assumed to be ideal ("brick-wall") for closed-form calculation simplicity. This assumption is somewhat optimistic. For non-ideal characteristics, it is simpler to do a numerical evaluation. In the results presented later two such characteristics are considered, corresponding to Butterworth filters of first and second order.

If the pdf is not known, then the peak-to-peak variation, in terms of the standard deviation, $\delta$, will be assumed to be $8\delta$. This assumption is somewhat pessimistic.

The clock noise of the oscillator is not included in these derivations but the manner in which the local oscillator affects ACR performance is indicated.

The details of the mathematical derivations are identical to those that arise in the analysis of Delta Sigma Modulators and is available, for example, in [4], and are omitted here.

Based on these assumptions, it is straightforward to show that the standard deviation (or "root-mean-square", i.e. rms, assuming a zero-mean process) of the source TIE sequence, $\delta_x$, and recovered-clock TIE sequence, $\delta_y$, are given by $$\sigma_x = \frac{\Delta_{pp}}{2\sqrt{3}}; \quad \sigma_y = \Delta_{pp}\sqrt{\frac{f_P}{6 f_A}} \qquad \text{(Eq. 6)}$$

where the units are time units such as sec/ms/μs. Note that the power of $\{y(n)\}$ appears to be directly proportional to the loop cutoff frequency $f_p$. This is a direct consequence of the assumption that $\{x(n)\}$ is a white noise sequence. If the spectral characteristic of the TDV is not white, but low-pass in nature, such as flicker noise, then reducing the loop bandwidth may not provide the reduction in (recovered-clock noise) power as indicated in Eq. (6). More than likely the TDV will have a white noise component, one that can be attenuated by the ACR filtering, and a "flicker floor" representing a component that passes through the filter (almost) regardless of the bandwidth. The importance of $\delta_y$ stems from the observation that the peak wander amplitude is of the order of $4\delta_y$.

A second important consideration is frequency stability. The "instantaneous" fractional frequency offset of the TIE sequence, $\{x(n)\}$, is given by $\{\Delta x(n)\}$ where $\Delta x(n) = [x(n) - x(n-1)] \cdot f_A$. That is, $\Delta x(n)$ is indicative of the frequency offset measured at the n-th epoch of the (ideal) clock, $f_A$. The entity is dimensionless and the units employed are, quite typically, parts-per-million (ppm). $\Delta y(n)$, representative of the recovered clock, is defined similarly. The standard deviation of $\Delta x(n)$, $\delta_{\Delta x}$, is indicative of the stability of the frequency reference that can be derived from the source TIE sequence; likewise, considering the filtered version, $\delta_{\Delta y}$ is indicative of the stability of the frequency achieved by the ACR method and is representative of the (short-term) frequency accuracy of the output DS1, at the R-IWF, relative to the input DS1 at the T-IWF. This parameter is important, for example, in wireless (cellular) telephony, where the base-station often derives its timing reference from the DS1 linking the base-station to the mobile switching center (or base-station controller). The peak frequency offset can be as much as 4 $\delta_{\Delta y}$ and, in the aforementioned wireless example, must be limited to 0.05 ppm (50 ppb). The stability measures for the source and recovered-clock TIE sequences are provided in Eq. (7), below, where the quantity $T_A$ (the "sampling interval") is the reciprocal of $f_A$ (the "sampling rate").

$$\sigma_{\Delta x} = \frac{1}{\sqrt{6}}\left(\frac{\Delta_{pp}}{T_A}\right); \quad \sigma_{\Delta y} = \frac{\pi\sqrt{2}}{3}\left(\frac{\Delta_{pp}}{T_A}\right)\left(\frac{f_P}{f_A}\right)^{\frac{3}{2}}; \quad T_A = \frac{1}{f_A} \quad \text{(Eq. 7)}$$

An alternative representation of the key standard deviation metrics for the recovered clock, provided in terms of the packet size, namely N information octets, and the service clock rate, $f_{serv}$, 1.544 MHz in the case of DS1, is provided in Eq. (8), below.

$$\sigma_y = \Delta_{pp}\left(\frac{4Nf_P}{3f_{serv}}\right)^{\frac{1}{2}}; \quad \sigma_{\Delta y} = \left(\frac{4\pi}{3}\right)\cdot\Delta_{pp}\cdot\left(\frac{N}{f_{serv}}\right)^{\frac{1}{2}}\cdot(f_P)^{\frac{3}{2}} \quad \text{(Eq. 8)}$$

The key messages in Eqs. (6-8) are that a. the performance of the ACR method is directly proportional to the magnitude of time-delay-variation introduced by the packet-switched network.

b. the performance can be improved by reducing the bandwidth of the loop implementing the ACR filter.

c. increasing the packet rate, for example by using small packet sizes (small N) or by inserting "dummy packets" to increase the effective rate, is very beneficial.

However, it should be stressed that the mathematical model assumes that the TDV introduced by the network is appropriately modeled as white noise. If this assumption is invalid, the actual performance could be significantly worse than that predicted by the equations.

The impact of the local oscillator can be included in the results by following the following rationale. The reciprocal of the (one-sided) loop bandwidth, $f_p$, is often called the loop time constant, $\tau_p$, and can be viewed as the averaging time or observation interval over which estimates regarding the source are constructed. To account for scaling between frequency units in Hz and rad/s, the actual relationship between time-constant and loop cut-off frequency is given by $\tau_P=1/(2\pi f_p)$. The instability of the local oscillator over this observation interval introduces a measurement error, affecting the veracity of the (filtered) recovered clock. Two measures of instability, TVAR and AVAR (see [5], for example), can be included to estimate the overall quality of the recovered clock in terms of time error and frequency error as shown in Eq. (9).

$$\sigma_y \cong \sqrt{\Delta_{pp}^2\left(\frac{f_P}{6f_A}\right) + TVAR(\tau_P)}; \quad \text{(Eq. 9)}$$

$$\sigma_{\Delta y} \cong \sqrt{\left(\frac{2\pi^2}{9}\right)\cdot\left(\frac{\Delta_{pp}}{T_A}\right)^2\cdot\left(\frac{f_P}{f_A}\right)^3 + AVAR(\tau_P)}$$

Jitter Analysis

It is conventional to refer to clock noise components at Fourier frequencies below 10 Hz as wander, and those above 10 Hz as jitter. The ACR generates the recovered clock utilizing a low-pass filter (with cutoff frequency of the order of 1 Hz or lower) and thus the spectral support of $\{y(n)\}$ will indicate that it is principally wander in the recovered clock ($f_B$). The high-speed service clock is generated from this recovered lock using a PLL. The smoothing, or low-pass nature, of the PLL is required to attenuate the high frequency components that are inherent in the up-conversion process. Thus the service clock wander is the same as the recovered clock and the service clock jitter must be estimated.

The up-conversion process, increasing the frequency, from $f_B$ to $f_{serv}$, is akin to the digital signal processing (DSP) concept of interpolation, where the sampling rate is increased, from $f_B$ to $f_{serv}$, and a low-pass filter used to attenuate the spectral replicates. In up-conversion, the PLL provides the low-pass characteristic, attenuating the replicates that are centered at $\pm f_B$, $\pm 2 f_B$, $\pm 3 f_B$, and so on. If the cutoff frequency of the smoothing PLL is $f_H$, then the spectral power, post smoothing, around $\pm k f_B$ is given by (approximately):

$$\sigma_J^2(k) \cong 2\sigma_y^2\cdot\left(\frac{f_H}{kf_A}\right)^{2n} \quad \text{(Eq. 10)}$$

where the subscript J identifies the power as a jitter contribution, and n is the order of the filter, typically 1 or 2. A typical value for $f_H$ is 50 Hz. Since the up-conversion factor is 8N, there will be (8Ñ1) replicates though the principal contribution to jitter will come from the first replicate corresponding to k=±1. Consequently, a reasonable estimate of the peak jitter is $4\delta_J(1)$.

Sample Calculations

Tables 1 and 2 provide some sample calculations of jitter (i.e. $\delta_J$), wander (i.e. $\delta_y$), and frequency error (i.e., $\delta_{\Delta y}$). The contribution of the local oscillator is ignored. The smoothing PLL characteristic is assumed to have a cutoff frequency of 50 Hz and the peak-to-peak TDV is 1 ms. The service clock is nominally 1.544 MHz (i.e. DS1) and the jitter and wander numbers are expressed in UI (unit intervals) at the DS1 rate. The jitter is provided for both first-order and second-order characteristics (see Eq. (5)). Three choices of ACR filter type are considered, corresponding to ideal, first-order, and second-order Butterworth and three choices of ACR filter cutoff frequency are made. In Table 1 we assume that the number of information octets in a packet is N=100 and, in Table 2, N=1000, corresponding to packet rates of 1.93 kHz and 193 Hz, respectively. For reference, the specification for maximum jitter is 0.5 UI, the wander must be less than 13 UI (15 minute interval), and for frequency error we impose a limit of 0.05 ppm (a limit of 0.0125 ppm, or 12.5 ppb, which is one-fourth the 50 ppb limit for DS1 span-lines used by wireless base stations as a frequency reference may be more appropriate).

TABLE 2

Calculations for the case N = 100

| | ACR loop cutoff $f_P$: | | | | | | | | |
|---|---|---|---|---|---|---|---|---|---|
| | 1.0 mHz ($10^{-3}$ Hz) | | | 10.0 mHz ($10^{-2}$ Hz) | | | 100.0 mHz ($10^{-1}$ Hz) | | |
| | ACR filter order: | | | | | | | | |
| | $1^{st}$ | $2^{nd}$ | Ideal | $1^{st}$ | $2^{nd}$ | Ideal | $1^{st}$ | $2^{nd}$ | Ideal |
| Freq. Err. $\delta_{\Delta y}$ (ppm) | 0.01 | 0.002 | 0.002 | 12.8 | 0.06 | 0.03 | 128 | 1.9 | 1 |
| Wander (UI) | 2.6 | 2.3 | 2.5 | 7.3 | 6.2 | 5.9 | 23 | 19.2 | 18.2 |
| Jitter (1-st order) (UI) | 0.11 | 0.1 | 0.1 | 0.35 | 0.25 | 0.24 | 2 | 0.8 | 0.75 |
| Jitter (2-nd order) (UI) | 0.02 | 0.002 | 0.002 | 0.18 | 0.006 | 0.006 | 0.02 | 0.02 | 0.02 |

TABLE 3

Calculations for the case N = 1000

| | ACR loop cutoff $f_P$: | | | | | | | | |
|---|---|---|---|---|---|---|---|---|---|
| | 1.0 mHz ($10^{-3}$ Hz) | | | 10.0 mHz ($10^{-2}$ Hz) | | | 100.0 mHz ($10^{-1}$ Hz) | | |
| | ACR filter order: | | | | | | | | |
| | $1^{st}$ | $2^{nd}$ | Ideal | $1^{st}$ | $2^{nd}$ | Ideal | $1^{st}$ | $2^{nd}$ | Ideal |
| Freq. Err. $\delta_{\Delta y}$ (ppm) | 0.01 | 0.006 | 0.003 | 12.8 | 0.2 | 0.1 | 128 | 6.1 | 3.4 |
| Wander (UI) | 7.3 | 6.2 | 5.9 | 22.8 | 19.2 | 18.2 | 71.9 | 60.5 | 57.4 |
| Jitter (1-st order) (UI) | 3.0 | 2.5 | 2.4 | 9.3 | 7.9 | 7.4 | 29.9 | 24.8 | 23.5 |
| Jitter (2-nd order) (UI) | 0.7 | 0.6 | 0.6 | 2.3 | 1.9 | 1.8 | 8.6 | 5.9 | 5.6 |

Concluding Remarks on Adaptive Clock Recovery

We have approached ACR in a theoretical way and derived equations that relate network parameters such as time-delay-variation, and design parameters such as loop bandwidths and packet rates (and sizes), to service parameters such as frequency accuracy, jitter, and wander. The conditions under which ACR works well, works marginally, and has trouble meeting legacy specifications can be easily determined. In particular, for transport of legacy DS1, it is recommended that the time-delay-variation be controlled to less than (of the order on 100 μs; the packet size be small, corresponding to a packet rate (of the order of) 2 kHz or higher; the ACR filtering loop be at least second order with a loop bandwidth (of the order of) 10 mHz; and the high-speed (1.544 MHz) clock generation use a second order PLL (phase locked loop) for jitter attenuation. The closed-form equations provided, albeit based on simplifying assumptions, can be used to make trade-offs between different design parameters such as packet-rate, loop bandwidth, and acceptable time-delay-variation. It should be noted that the quality of oscillator must match the desired loop bandwidth. For loop bandwidths less than 1 mHz, high-performance oscillators, such as a "Double Oven Crystal Oscillator" (D-OCXO) may be required; for loop bandwidths below 100 μHz an oscillator based on a rubidium atomic standard is recommended.

Generally speaking, ACR is a technique that should not be used as the primary mode of service clock transfer unless there is no other alternative. However, ACR can be used to advantage as a supplement to another primary clock transfer mechanism. In Ref. [7] Powell points out that ACR performs well as an adjunct to SRTS for circuit emulation over an ATM network. Specifically, Powell utilizes buffer fill information to adjust the parameters of the PLL employed in generating the service clock based on the SRTS information.

Encoding Methods—Method 1—SRTS

As mentioned in Y.1413, one approach for encoding methods is the *Synchronous Residual Time Stamp* (SRTS) method suggested for ATM networks and described in [4]. The notion of SRTS that has been standardized as one means for transporting service clock over an ATM network (as in ATM Adaptation Layer 1 or AAL1) may well be extended to general packet networks as well. Encoding methods, such as SRTS, are considered for Architecture #3 in ITU-T Recommendation Y.1413 and shown in FIG. 4. The underlying principle of SRTS is to transport a measure of the difference in service clock and network reference, as established in the transmitting IWF, across the network (as a message appended to a packet or as part of the packet itself). The receiving IWF can reconstruct the service clock using this measure of frequency difference in conjunction with its own network timing reference. Note that this mandates that both IWFs have a "common" timing reference, most advantageously obtained by providing each IWF with a G.811-traceable timing reference. The difference in service clock between the ingress and egress points will be directly related to the difference in network timing references at the two IWFs.

SRTS is a patented technology and protected by U.S. Pat. No. 5,260,978, *Synchronous Residual Time Stamp for Timing Recovery in a Broadband Network*, Issued Nov. 9, 1993; assigned to Telcordia Technologies.

Encoding Methods—Method 2—ATDS

An alternative to methods based on SRTS are methods based on ATDS (Advanced Timing Distribution System) described in Ref. [17] and [18]. ATDS is a method that was developed to "flatten" the timing distribution network in a SONET environment. Modifications to ATDS permit it to be used effectively in a circuit emulation scenario where the end-points (i.e. the IWFs) have the notion of a common clock.

In a SONET environment, the DS1 clock (nominally 1544 kHz) is divided down to 1.93 kHz to create a timing signal. A timing signal is simply a clock waveform that carries timing information (frequency) in its significant events (typically rising edges). The rising edge position with respect to the transmit SONET (8 kHz) frame is encoded in terms of number of intervals established by the SONET transmit (optical line) clock. At the receiver, this information is used in conjunction with the recovered optical line clock and recovered SONET frame to recreate a replica of the timing signal. Regeneration of 1544 kHz clock is then a simple matter. The fundamental reason why this method is efficient is that the frequency of the timing signal (1.93 kHz) is "relatively prime" to the 8 kHz it is being compared against. This ensures that there are no systematic errors generated because of the quantization of the rising edge position. The choice of 1.93 kHz had another advantage. In every group of 4 SONET frames there would be at most 1 significant event of the timing signal. This allowed for an efficient encoding implementation using one octet in the SONET overhead.

In a DOCSIS environment the end-point IWFs do indeed have a "common" 10.24 MHz clocks. The notion of "common" is that the frequency offset between the time-bases at the IWFs will be small, typically less than $2 \times 10^{-11}$ (i.e. each side is G.811-traceable). Furthermore, the IWFs have the notion of a 32-bit Time-Stamp Counter that can be UTC-traceable. For the encoding method described here UTC-traceability is not mandatory.

ATDS for Encoding Clock in a DOCSIS Environment—Outline

The scheme for transporting service clock by encoding suitable information at the T-IWF that can be utilized by the R-IWF is quite simple and is outlined here.

The first step is to establish a suitable timing signal frequency, $f_{TS}$. Since information regarding each rising edge needs to be sent to the distant end, it is advantageous to keep $f_{TS}$ as small as possible; on the other hand, the phase locked loop design and quality of oscillator required are affected by this choice and a large value of $f_{TS}$ is desirable from this standpoint.

A value of $f_{TS}$=1.1488095 . . . kHz (1544 kHz÷1344) is a possible compromise. The rationale underlying this choice is as follows. Since 188-octet packets are a "natural" occurrence in a DOCSIS architecture (4-octet "header" and 184-octet "payload" MPEG packet), it is clear that this same packet size will be appropriate for circuit emulation services as well. If 168 octets are used to carry "information" from the emulated DS1, 16 octets remain to carry the ATDS-Time-Stamp as well as other overhead information (to be determined). Generating 168 octets from an unstructured DS1 implies the division by 1344 and hence the chosen value for $f_{TS}$. It is obvious that other choices of $f_{TS}$ are possible but this value will be used here for specificity.

Figure 12:
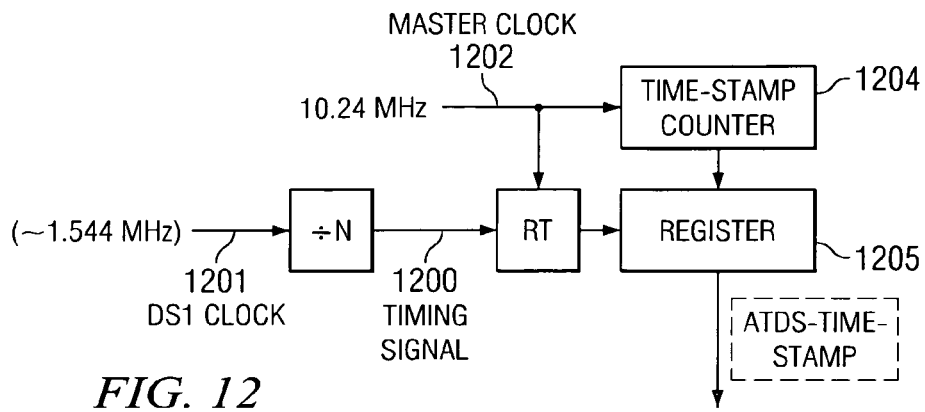
FIG. 12 shows the generation of the ATDS-Time-Stamp, representing an embodiment of the invention.

The ATDS-Time-Stamp represents the value of the DOCSIS Time-stamp counter value at the significant epoch, i.e. rising edge, of the Timing Signal. This is depicted in FIG. 12, below.

The Timing Signal 1200 is generated by dividing the DS1 (service) clock 1201 by N (=1344). The block labeled RT in FIG. 12 implies that the edge is retimed to the master clock 1202 as a precaution against meta-stable states and race conditions. The retimed signal is used to clock the value of the DOCSIS Time-stamp counter into a register. This is the ATDS-Time-Stamp.

Making the Timing Signal frequency equal to the packet rate has the advantage that the ATDS-Time-Stamp can be transported in the packet stream very easily. Whereas the complete time-stamp is 32 bits wide, just the least significant bits are required for ATDS operation. In the situation considered here, 16 bits (2 octets) are adequate. That is, two octets in the packet are reserved for the A TDS-Time-Stamp 1205.

Figure 13:
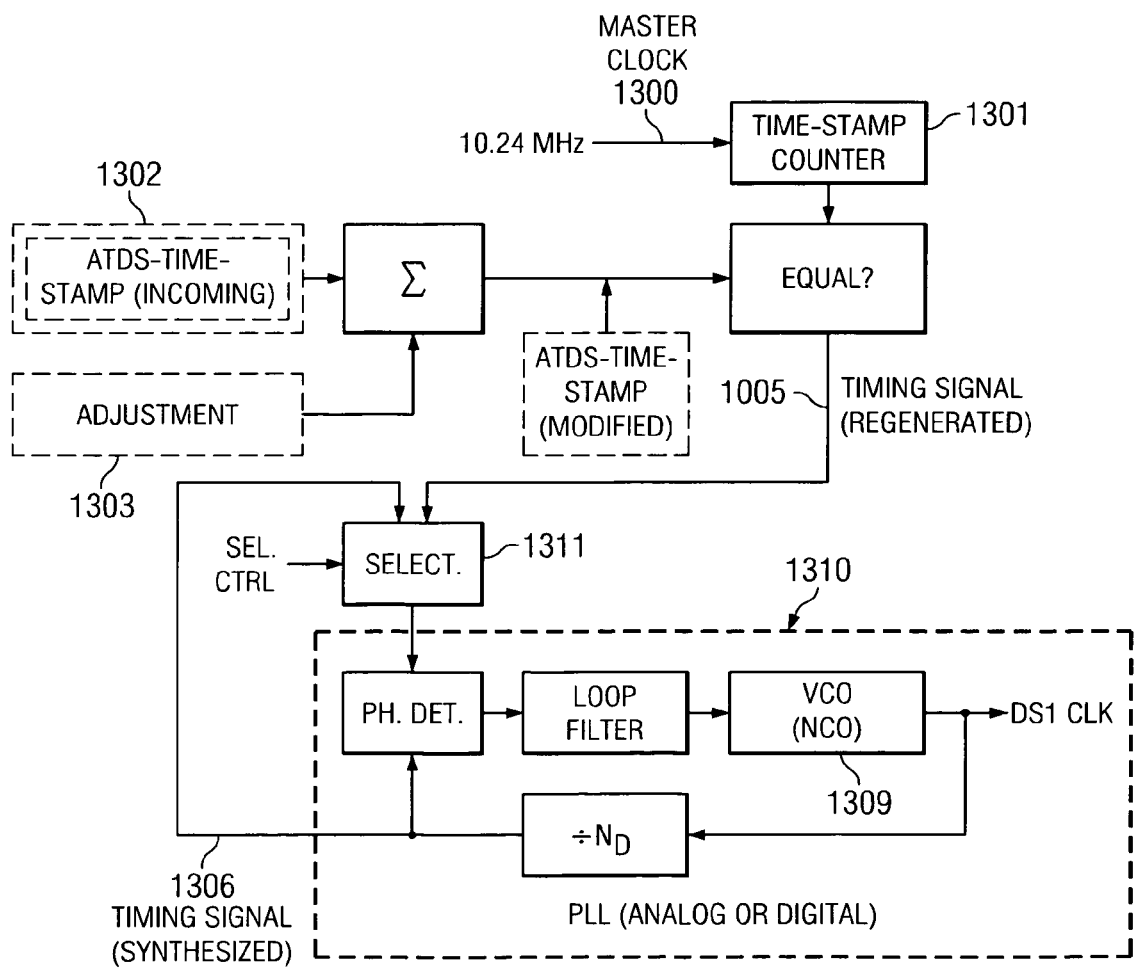
FIG. 13 shows the regeneration of the ATDS Timing Signal and Output DS1 Clock, representing an embodiment of the invention.

A replica of the Timing Signal can be generated very easily at the egress IWF by comparing the incoming ATDS-Time-Stamp with (the 16 least significant bits of) the local Timestamp Counter 904. This is depicted in FIG. 13, below. As shown in FIG. 13, the incoming ATDS-Time-Stamp 1302 can be modified prior to the comparison. This is shown as adjustment 1303. The need for this functionality, and an appropriate implementation, is described later. The incoming time stamp is compared with the time stamp counter 1301 and the master clock 1300.

The regenerated Timing Signal 1305 can be applied to a simple phase-locked-loop to generate the (recovered service clock) 1.544 MHz clock for generating the DS1 output. Note that there could be instances where the incoming time-stamp is lost in the packet transport network or arrives too late. This situation is easy to detect and a synthetic edge introduced into the regenerated Timing Signal in order to maintain proper operation of the phase-locked-loop. One method for introducing this synthetic edge is indicated in FIG. 13. The PLL 1310 is likely to have a "local" version of the Timing Signal (also referred to as "synthesized") that is, in principle, phase-locked to the regenerated Timing Signal. In the event that the regenerated Timing Signal is invalid, the synthesized version 1306 is selected (1311). It should be noted that there are several schemes for maintaining proper PLL operation in the event of a corrupted "reference" signal.

In FIG. 13, the notion of the local Timing Signal is obtained by dividing the regenerated DS1 clock by $N_D$; typically $N_D$=1344 for the chosen value of $f_{TS}$. In digital PLL implementations the "division" can be achieved using techniques of "numerically controlled oscillators" (NCOS) and in these situations it is possible to allow $N_D$ to be slightly higher or lower than the nominal value in the event that the regenerated output clock must be increased or decreased slightly relative to the value that would be generated by the given regenerated Timing Signal.

In FIG. 13 the notion of adding an "adjustment" 1302 to the incoming ATDS Time-Stamp is to add the facility of adjusting the regenerated DS1 clock away (higher or lower) from the frequency that would be associated with the given incoming ATDS-Time-Stamp sequence.

With the chosen value of $f_{TS}$=1.1488095 . . . kHz (1544 kHz÷1344), there will be nominally 8913.575 . . . counts of the 10.24 MHz clock between significant events of the Timing Signal. Using 16 bits of the DOCSIS Time-stamp should be adequate to avoid any ambiguity in the encoding. In practice, the actual count will be typically either 8913 (1.14888 . . . kHz) or 8914 (1.14875 . . . kHz). The jitter introduced by bouncing between these values will be of high enough frequency to be easily filtered out by the PLL.

ATDS Encoding—Enhancements

The efficacy of encoding methods is based on the fact that the IWFs have a "common" clock or very nearly so. Under normal conditions the DOCSIS time-base is tied to a common reference such as GPS or some other Primary Reference Source (PRS) and can qualify as a G.811-traceable clock (see Ref. [19]), implying that the differential accuracy between the clocks in different IWFs is better than $2 \times 10^{-11}$. However, in "abnormal" conditions, one or both of the IWFs may be operating in a "holdover" mode and the accuracy then depends on the quality of the oscillator used.

Powell (see Ref. [7]) has recognized the need for adjusting the recovered DS1 (service) clock to account for discrepancies in the network timing references used in SRTS implementations within ATM networks. The same approach can be used to enhance the performance of ATDS used in circuit emulation over packet networks. The essence of the method is to use a modicum of adaptive clock recovery methods to do a fine adjustment of the regenerated clock. In particular, Powell utilizes buffer-fill information to adjust the parameters of the phase-locked loop. An alternative to Powell's method is described here.

The enhancement of ATDS, a scheme also applicable to Architecture #2, involves adjusting the regenerated clock up or down based on the buffer fill. It should be emphasized that the frequency increment is small. That is, the encoding method such as ATDS, or the use of a network timing reference (Architecture #2) will serve as the primary mechanism for generating the DS1 output clock. The buffer fill adjustment, reflective of adaptive clock recovery methods, will be used solely to "tweak" the DS1 output clock with the intent of minimizing buffer overflow/underflow events.

Two approaches for achieving this (small) adjustment are described here. Both of them utilize the notion of an NCO form. The theory and principles of DDS and NCO forms is quite well known and is well explained in Ref. [20].

1. The Adjustment method. In this approach, a locally generated numerical sequence is added to the incoming ATDS-Time-Stamp as shown in FIG. 13. Adding a constant value will have no effect on the frequency of the regenerated DS1 clock. However, if the sequence corresponds to a ramp, then the regenerated DS1 output frequency will differ from the frequency implied by the incoming ATDS-Time-Stamp sequence by an amount proportional to the slope of the ramp.
2. The NCO method. In this approach the division factor, $N_D$, is implemented using an NCO form (the acronym DDS, for direct digital synthesizer, may be used in this case). Essentially, the NCO form permits the "division ratio" to be changed "on the fly". In particular, the division ratio can be made less than or more than the nominal value (of 1344) forcing the regenerated DS1 clock to be lower or higher than the nominal value implied by the incoming ATDS-Time-Stamp sequence.

Figure 18:
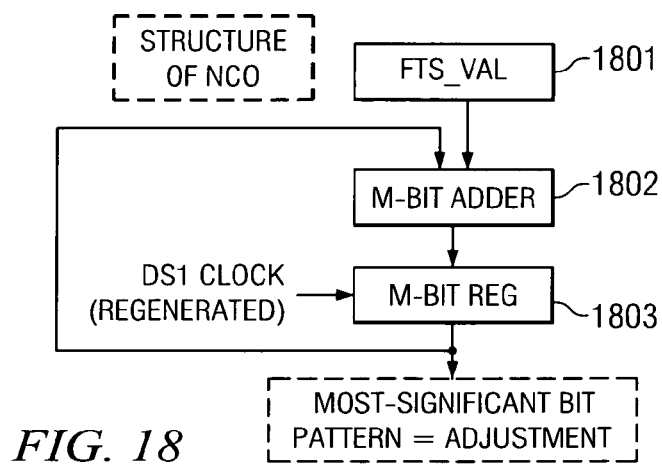
FIG. 18 shows the Numerically Controlled Oscillator (NCO) for deriving Timing Signal, representing an embodiment of the invention.

The Adjustment can be generated using an NCO form as depicted in FIG. 18. The accumulator arrangement generates the ramp required. The slope of the ramp is determined by FTS_VAL 1701. In its simplest form, the Adjustment method has just three values for FTS_VAL. These are $+\Delta$, 0, and $-\Delta$. The value 0 corresponds to a zero slope and is appropriate if no adjustment is required to the regenerated DS1 output clock. The values $+\Delta$ and $-\Delta$ introduce positive and negative slopes, respectively, corresponding to an upward or downward adjustment in regenerated DS1 output clock frequency. In fractional terms, this adjustment will be $\pm(\Delta \cdot 2^{-M})$ where M represents the size of the adder 1702 and the accumulator 1703. In order to ensure that the adjustment does not contribute any untoward wander, it is advisable to restrict the adjustment to be less than $9.3 \times 10^{-9}$ (9.3 ppb). The rationale is that a sustained frequency offset of this magnitude is a limiting case for meeting G.824 (15-min wander). A higher value can be employed if reasonable care is taken to not allow such a sustained frequency offset. A method to establish this adjustment is described later.

The (fractional) frequency granularity of the NCO needs to be of the order of $10^9$ and therefore the accumulator 1703 word-length needs to be of the order of 30 bits or greater. Assuming M=32, the granularity is $\sim 2.3 \times 10^{-10}$, for $\sim 9 \times 10^{-9}$, the value of $\Delta$ is $\sim 40$. Note that the most-significant bits are used as the Adjustment; since the assumed word-length for the ATDS-Time-Stamp is 16 bits, the two most significant bytes of the accumulator are used.

Figure 17:
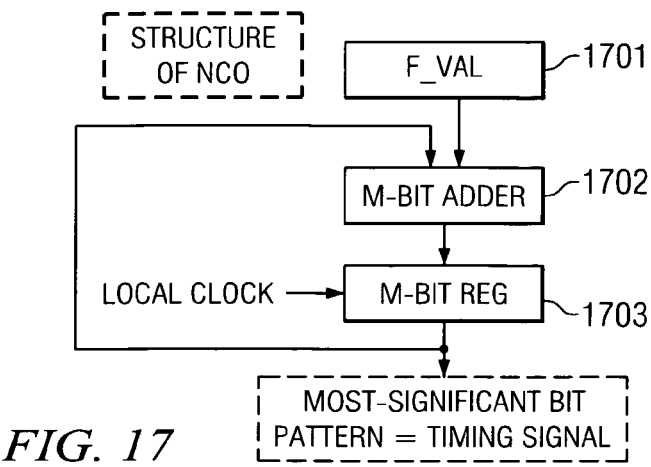
FIG. 17 shows the Numerically Controlled Oscillator (NCO) for deriving Adjustment, representing an embodiment of the invention.

In the NCO method, the "division by $N_D$" to obtain a local Timing Signal ("synthesized") is implemented using an NCO which is assumed to be part of the DPLL arrangement for implementing the PLL depicted in FIG. 13. The structure of this NCO is depicted in FIG. 17. The F_VAL 1801 is sent to the M-bit adder 1802 and then to the accumulator 1803. Again, for specificity, we assume M=32 (bits). For reference, the ideal value for F_VAL 1801 is $\sim 3195660.19 \ldots$ and the closest integer is 3195660. That is, the "divide by 1344" is not exact. In particular, the nominal value for $f_{TS}$ (1544 kHz÷1344) is $1.148809524 \ldots$ kHz whereas the setting F_VAL=3195660 will generate $1.148809455 \ldots$ kHz. This "error" is of the order of $10^{-7}$ and must be accounted for in the design of the PLL. However, this "error" is rendered moot considering the adjustments that will be made to F_VAL on a dynamic basis.

In both cases considered, Adjustment method and NCO method, the control word is determined, or adjusted, based on the FIFO buffer-fill. One view of the FIFO buffer is that of a circular buffer as described next.

A circular buffer view of the FIFO was depicted in FIG. 3. Note that the DSP clock is, essentially, tied to the ADC clock since the DSP entity generates speech segments based on packet arrival and that is, if one follows the chain of transmission, linked to the rate of packet generation that is tied to the ADC clock. Likewise, the line interface unit (LIU) is tied to the DAC clock.

A good way of visualizing the double-buffer action is to consider a circular buffer as depicted in FIG. 3. The memory is organized in a circular manner with address calculations done Modulo-2N, where 2N is the total number of memory locations. From the viewpoint of the DS0 channel under consideration, each location holds one octet (corresponding to one octet per sample), the buffer has a "length" of (2N/8) ms, introduces a nominal delay of (N/8) ms, and can accommodate $\pm$(N/8) ms of wander. The operation is quite simple. With each write operation the write pointer 301 moves one location counter-clockwise and likewise the read pointer 302 moves one location counter-clockwise with each read operation. If the relative time error between the read and write clocks is zero, then the pointers remain a fixed distance apart. A frequency offset will result in one pointer catching up to the other, resulting in an overflow/underflow. The reset position is when the pointers access diametrically opposite locations. When an overflow/underflow occurs, one pointer is forcibly moved to be diametrically opposite to the other. This action causes data corruption in the sense that N octets will be either lost or repeated.

The most common Circular Buffer Implementation is through using a Dual-Port-RAM (DPR). There is a definite advantage from the viewpoint of hardware implementation to make the size of the circular buffer a "power of 2". This is because implementing "modulo-2N" arithmetic is quite straightforward in this case. Specifically, if $2N=2^B$, then by using B-bit arithmetic and 2's-complement number representation, "modulo-2N" arithmetic is achieved by just ignoring overflow or underflow indications when two numbers are added (subtracted). Using a dual-port-RAM (DPR) element to implement a circular buffer is well known. Here we utilize a DPR to implement the circular buffer.

Of special importance is the "width" of the DPR. In conventional implementations, the width of the DPR will be equal to the word-length used to represent the samples. Since we have assumed 8 bits per sample, a conventional circular buffer would use a byte-wide DPR. Here we make the DPR 9 bits wide. The additional bit is used to encode the flag generated by the signal-processing function to designate the byte as "actionable". This added information is one aspect of the invention disclosed herein.

Also of special importance is the manner in which the READ address is generated. This is one aspect of the invention disclosed here. In particular, the READ address is generated in such a manner as to permit the merging of two functions. One function is that of the "conventional" circular buffer. The other function is a controlled slip action. Introducing the controlled slip action, whereby a sample (octet) is repeated/deleted based on a control signal, allows a rate-adjustment, permitting a (small) frequency offset between the DAC clock and the DSP clock (note that the DSP clock is reflective of the ADC clock at the distant end encoder).

Figure 14:
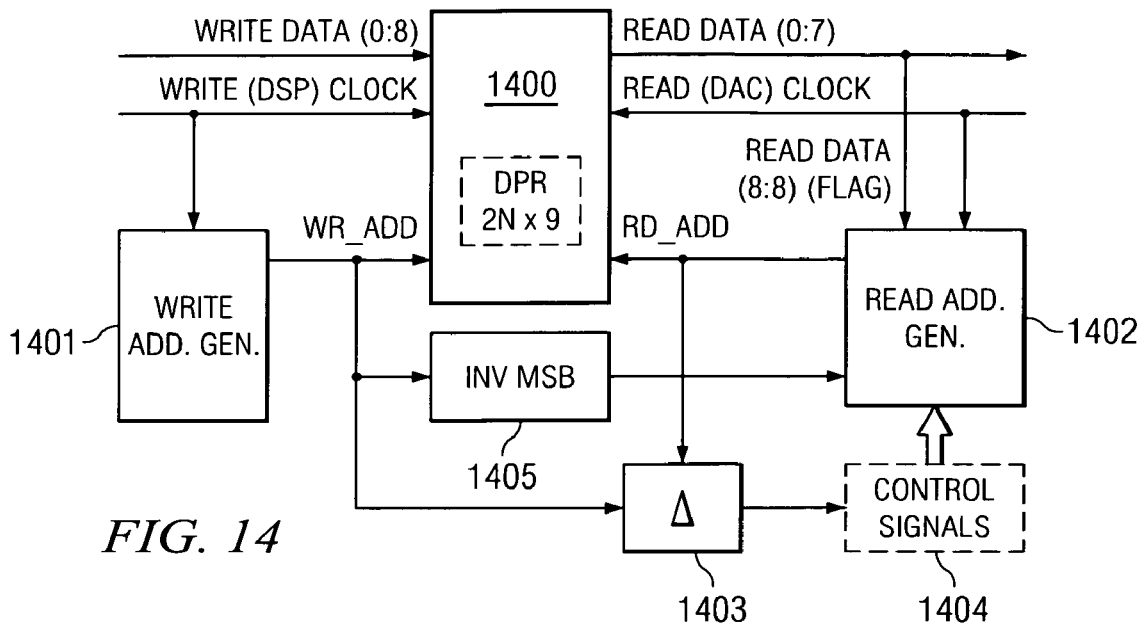
FIG. 14 shows a simplified view of circular buffer arrangement, representing an embodiment of the invention.

A simplified view of the circular buffer arrangement is depicted in FIG. 14. The data written into the DPR 1400 comprises 9 bits where 8 bits (0:7) consist of the sample octet and the $9^{th}$ bit, (8:8), is the flag. The size of the circular buffer is 2N locations, each location containing 9 bits and it is assumed that $2N = 2^B$. The data read out of the DPR comprises 9 bits where 8 bits (0:7) consist of the sample octet that is delivered to the DAC. The $9^{th}$ bit, (8:8), is the flag that is required in the "Read Add. Gen." block 1402 where the read address ("RD_ADD") is generated. In this implementation it is assumed that the nuances of the method are implemented in the "Read Add. Gen." block, and thus the "Write Add. Gen." block 1401 where the write address ("WR_ADD") is generated can be quite simple. The "Read Add. Gen." block 1402 has the feature of recentering in the event (hopefully unlikely) of buffer overflow/underflow. Under normal operation, the accumulator increments by 1, providing the counter functionality. Details of the "Read Add. Gen." block are presented below. The block 1405 labeled INV MSB generates the opposite of the write address in case the buffer has to be reset, in the case overflow/underflow is detected. This is done by setting the read address to be the opposite of the write address, so that the pointers are on opposite ends of the circular buffer. The block 1403 labeled "Δ" generates the difference between the read and write addresses ["RD_ADD"-"WR_ADD"] where the B-bit numbers are interpreted as 2's-complement represented integers. The block 1404 labeled "Control Signals" represents the circuitry implementing the logic associated with the control signals required by the "Read Add. Gen." block 902. The functions associated with the various blocks are elaborated upon next.

The "Write Add. Gen." block 1401 is quite straightforward. It can be implemented as a B-bit binary counter that is allowed to "wrap-around" from the all-1s state to the all-0s state. The counter operation is controlled by the "Write (DSP) clock". When this clock is asserted, the input data is written into the DPR in the location pointed to by the counter contents, "WR_ADD", and the counter incremented by one.

The block 1403 labeled "Δ" generates the difference ["RD_ADD"-"WR_ADD"]=Δn. This is done using 2's-complement arithmetic and since the addresses correspond to B-bit numbers, $2^B \geq |\Delta n|$. When the read and write pointers are diametrically opposite each other, the difference has a magnitude of $2^B$; when the pointers are close to each other the difference is small in magnitude; when they coincide the difference is zero. Considering the circular nature of the buffer, defining which is "ahead" is somewhat moot. For our purposes, if Δn is positive the write pointer is "catching up" to the read pointer; if Δn is negative the read pointer is catching up to the write pointer.

Assigning appropriate actions based on the value of Δn is a key aspect of the invention. To this end, three "threshold values", $T_3 > T_2 > T_1$ are predetermined. Suitable choices for these thresholds and the underlying rationale are provided later. Comparison of Δn with these determines the "state" of the adaptive play-out buffer; the state then determines the appropriate action.

a. If $|\Delta n| \geq T_3$, the state is "green". The implication of the "green" state is that the read and write pointers are far apart and no special action is taken. The "increment" applied to the read address counter (discussed shortly) is unity implying the counter operates in a normal manner.

b. If $T_3 > |\Delta n| \geq T_2$, the state is "yellow". The implication of the "yellow" state is that the read and write pointers are possibly coming closer and some action is required. This takes the form of a controlled slip provided some other conditions are met. A controlled slip involves repeating or deleting one signal sample. This is achieved by controlling the "increment" applied to the read address counter. Making the increment 0 (zero) means the counter does not increment allowing the read address to remain the same for two consecutive read operations (repeating a sample). This is done if Δn is negative (read catching up with write). Making the increment 2 (two) means the read address skips one location between two consecutive read operations (deleting a sample). This is done if Δn is positive (write catching up with read). The aforementioned conditions are the following:
  1) The flag associated with the current read data should be true. The flag will be set true by the signal processing block if the sample is part of an "actionable" signal segment.
  2) The timer has expired. The timer is essentially a counter that is reset (to zero) when a slip event (repetition/deletion) has occurred. The timer counter is incremented by the DAC clock and saturates at a (pre-determined) maximum value. Until it reaches this maximum count, slip events are inhibited. The intent is to ensure that slip events are not allowed to occur too close together.

c. If $T_2 > |\Delta n| \geq T_1$, the state is "orange". The implication of the "orange" state is that the read and write pointers are very likely coming closer and some action is definitely required. This takes the form of a controlled slip provided some other conditions are met. This is similar to the yellow state with relaxed conditions. In particular, the flag is ignored. The timer constraint is the same as for the yellow state.

d. If $T_1 > |\Delta n| > 0$, the state is "red". The implication of the "red" state is that the read and write pointers are very close to each other and some extreme action is required. This takes the form of a controlled slip provided the timer constraint is met (as in the orange state) as well as a request to the signal processing entity that packet loss concealment must be initiated. If Δn is negative a segment of synthetic speech must be inserted; if Δn is positive a segment of speech must be deleted.

e. If Δn=0, the state is "catastrophic" implying that the write pointer and read pointer are coincident. This requires drastic action. This is achieved by re-centering the buffer. That is, the read pointer is "reset" to be diametrically opposite to the write pointer. N samples will be lost or repeated by this action that is equivalent to buffer overflow/underflow.

Suitable values for the thresholds are $T_3=(\frac{3}{4})N$; $T_2=(\frac{1}{2})N$; $T_1=(\frac{1}{4})N$, where the size of the overall buffer is 2N. If the packet loss concealment algorithm is not very sophisticated and thus should be minimally invoked, an alternate set of threshold values is $T_3=(\frac{7}{8})$N; $T_2=(\frac{3}{4})$N; $T_1=(\frac{1}{8})$N. These choices are well suited for efficient implementation and it is unlikely that "optimum" values for these thresholds, derived by any sophisticated means, will provide an efficacy that much greater than this particular set to warrant an increase in implementation complexity. The value for N, the buffer size, depends on the expected time-delay variation. If we assume a packet size of 20 ms (160 speech samples) a "typical" time-delay variation will be ±10 ms, corresponding to ±0.5 packet duration. A suitable value for 2N is the closest power of 2 greater than the peak-to-peak time-delay variation, which, in this case, corresponds to N=128 (B=8). N=128 implies that the adaptive play-out buffer introduces a latency of 16 ms (half the buffer size). A suitable value for the timer is the closest power of 2 less than the packet size and in this case is 128. With this choice of timer, the slip events will be constrained to no more than twice per packet duration.

Figure 15:
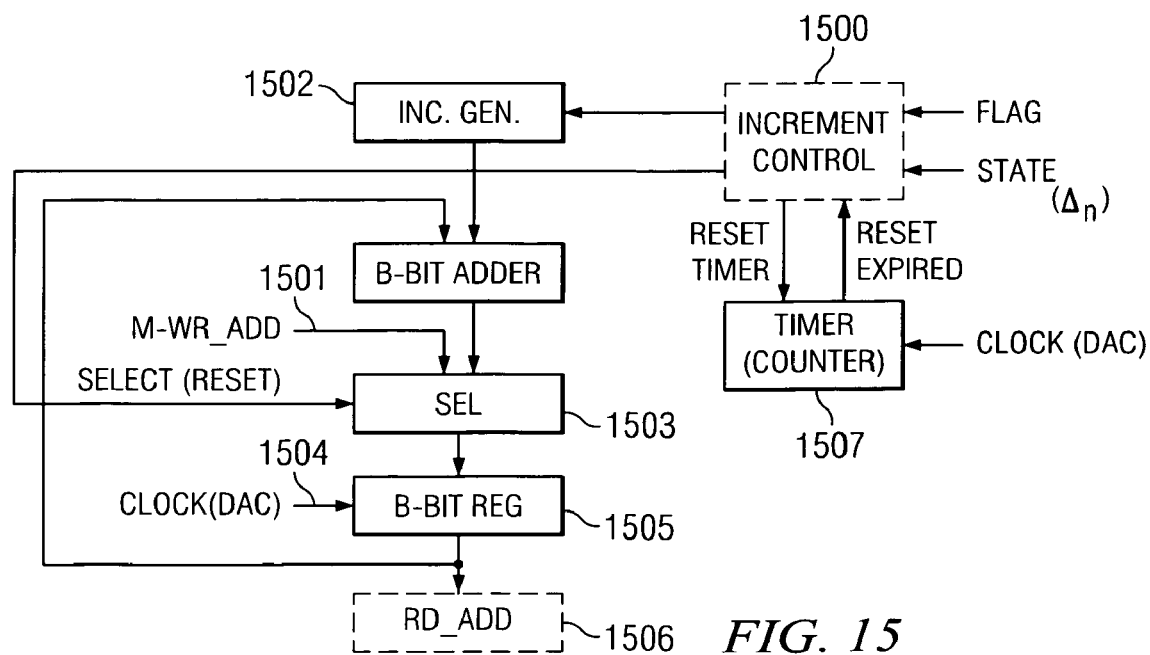
FIG. 15 shows the details of the "Read Add. Gen." Block, representing an embodiment of the invention.

The block 1402 labeled "Read Add. Gen." is important since this is a key aspect of the invention. A simplified view of this block is shown in FIG. 15.

The entity 1501 labeled M-WR_ADD represents the WR_ADD with the most significant bit inverted and thus represents the address diametrically opposite the write pointer. If Δn=0, the drastic action taken is to make the select control choose M-WR_ADD to load into the read address register (see item "e" above). The read address counter is implemented as an accumulator 1505 that is updated based on the DAC clock 1504. Under normal counter operation the increment 1502 is 1 (unity); in the controlled slip case the increment is either 0 (zero) or 2 (two) corresponding to repeating or deleting a sample, respectively.

The block 1500 labeled "Increment Control" is at the heart of the invention of the adaptive play-out buffer. The actions have been described before but are summarized here for completeness. Based on the various state conditions this block controls the generation of the increment used by the read address counter:

1. If State is Catastrophic (Δn=0):
   i. Assert reset (forcing read pointer to be diametrically opposite to write pointer)
   ii. Reset timer. This is optional. Included for specificity.
   iii. Set increment to 1. This is optional since counter action is overridden by reset action.

2. If State is Red:
   i. Deliver message to signal processing entity that packet loss concealment (deletion or synthesis, based on sign of Δn) is required. FIG. 10 does not show this control signal because it is quite implementation dependent.
   ii. If timer has not expired, set increment to 1.
   iii. If timer has expired, set increment to 0 or 2 depending on sign of □n and reset timer.

3. If State is Orange:
   i. If timer has not expired, set increment to 1.
   ii. If timer has expired, set increment to 0 or 2 depending on sign of □n and reset timer.

4. If State is Yellow:
   i. If timer has not expired, or flag is false, set increment to 1.
   ii. If timer has expired, and flag is true, set increment to 0 or 2 depending on sign of Δn and reset timer.
   iii. Note: If the signal processing entity does not provide the flag it is deemed to be always true.

5. If State is Green:
   i. Set increment to 1. (Normal counter operation)

Figure 16:
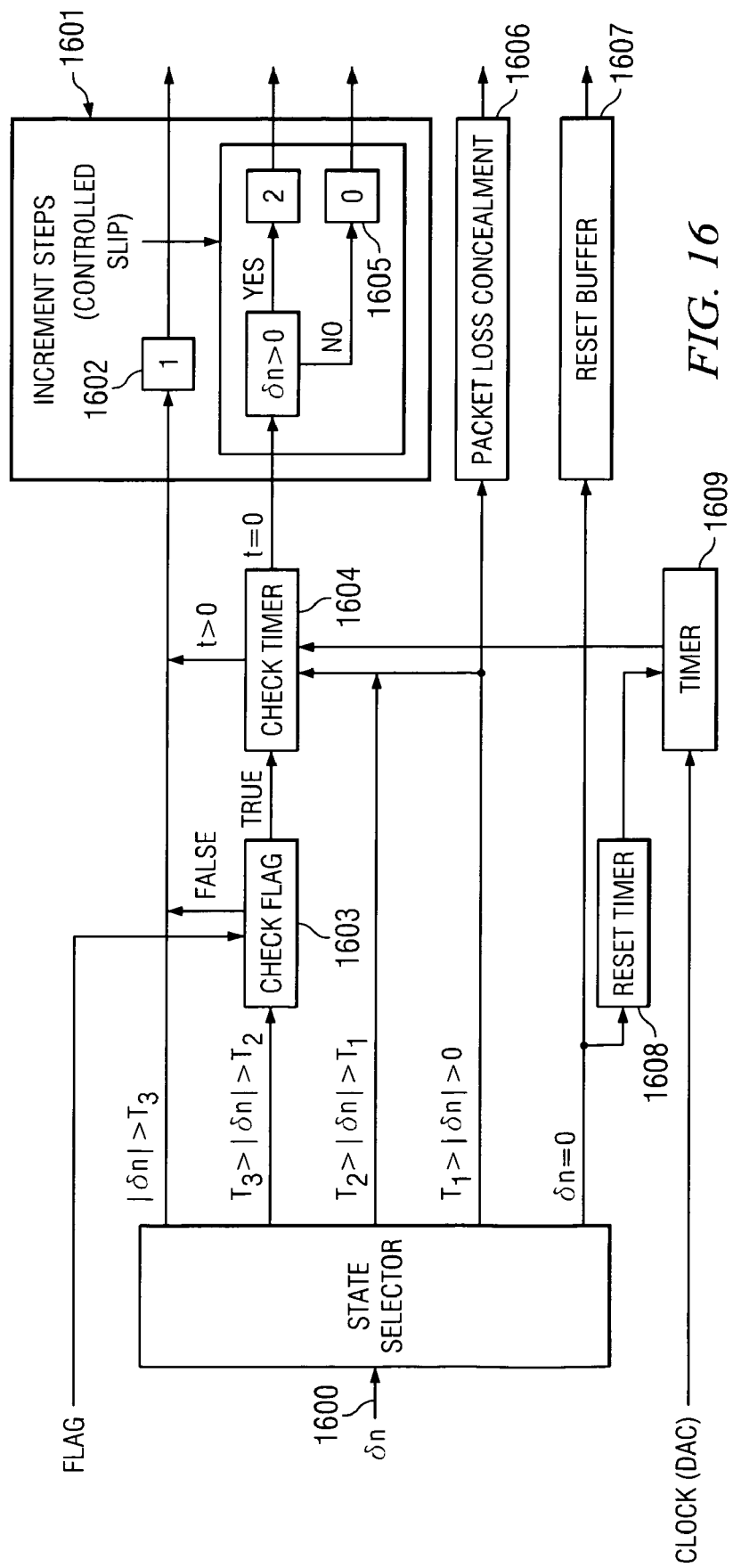
FIG. 16 shows details of the increment control of the "Read Add. Gen", representing an embodiment of the invention.

One possible implementation of the increment control is shown in FIG. 16. The increment control takes as its inputs the Δn value, the DAC clock, and the flag from the data sample. The Δn value (1600) goes through a state selector which compares it to the threshold values. In the green state, the increment step (1601) is 1. The check flag block 1603 is invoked only in the yellow state. The check timer block 1604 is invoked during the yellow, orange, and red states. If the timer 1609 has expired (t=0) in the yellow, orange, or red states, a controlled slip is initated, based on the sign of Δn (1605). Additionally, in the red state, a packet loss concealment message (1606) is sent to the signal processing subsystem. In the catastrophic state, the timer is reset (1608), and the buffer is reset (1607), by setting it to the write address with the most significant bit inverted, which corresponds to the opposite location in the circular buffer.

It should be pointed out that the play-out buffer can be implemented with less than three threshold values. In a system without the flag, $T_3$ and thus the yellow state would not exist. Alternately, in a system without a packet loss concealment implementation, $T_1$, and thus the red state, would be eliminated. One possible assignment of values for the threshold values in a two-threshold system is $T_2=(\frac{1}{2})$N and $T_1=(\frac{1}{4})$N, where 2N is the total size of the buffer. If a system lacked both the flag and the packet loss concealment algorithms, only one threshold value T would be required. The system would then have three states, the green state for Δn>T, the orange or controlled slip state for T>Δn>0, and the catastrophic state for Δn=0. One possible assignment of values for the threshold value on such a one-threshold system is $T=(\frac{1}{2})$N, where 2N is the total size of the buffer.

The adaptive clock operation will now be described. Whereas the adaptive play-out buffer permits the absorption of a frequency offset (using controlled slips) between the ADC and the DAC and also accommodates some wander introduced by the time-delay variation across the IP network, the adaptive clock operation described here adjusts the DAC clock in a subtle way to reduce the frequency offset between the ADC and DAC clocks. The adaptive clock operation can be deployed even if the controlled slip mechanism is not, just as the controlled slip mechanism can be deployed without adaptive clock operation. However, the adaptive clock operation is most effective when used in conjunction with the controlled slip mechanism (adaptive play-out buffer described above).

The basis of the adaptive clock operation is summarized as follows:

1) The notion of adaptive clock recovery is reasonably well known and has been proposed for transfer of service clock in circuit emulation schemes for transporting a constant-bit-rate signal over an IP network (see Ref [11] and references therein). However, the unbounded nature of IP networks renders the recovered clock based on such methods unusable because of excessive wander. If conventional adaptive clock recovery schemes are used in the VoIP application considered here, there could well be excessive wow and flutter.

2) The reason why the adaptive clock recovery schemes devised for circuit emulation generate so much wander is that the clock recovery scheme is the only mechanism available to prevent buffer overflow/underflow. In the VoIP application considered here there are other mechanisms available. These include packet loss concealment (prior-art) as well as adaptive play-out buffers that utilize a controlled slip mechanism (this invention disclosure).

3) The method described here sets a limit to the adjustment of the local clock in order to maintain wander to a low level and thus make the accompanying wow and flutter imperceptible.

4) The method assumes that the DAC clock (typically 8 kHz) is obtained by dividing down a high-speed local clock that has reasonable stability such as a quartz oscillator. Furthermore, the division is achieved wholly or in part using a numerically controlled oscillator ("NCO") method (well known in prior-art and described later).

5) The method utilizes the buffer fill information, Δn, or, equivalently, the state of the buffer as described before, to adjust the NCO up or down by a small increment. This is achieved by adding (subtracting) a small value to the NCO control word that determines the derived (DAC clock) frequency.

6) The method utilizes a timer (called timer-A to distinguish it from the timer in the adaptive play-out buffer method) to limit how often the clock frequency (NCO control word). The magnitude of the (small) increment and the timer-A duration determine the maximum rate of change of DAC clock frequency (i.e. frequency drift rate). No standards are available that specify what the maximum drift rate for consumer audio applications should be but is very likely to be less than about 1 ppm/s (1 part-per-million per second). Adjusting the increment value and timer duration to meet a given requirement is quite straightforward.

The NCO operation for deriving the DAC clock from a high-speed (local) clock will now be described. The operation of the NCO is depicted in FIG. 17. It is assumed that local clock is a high-speed, stable, clock and the NCO directly derives the DAC clock.

Suppose that the local clock frequency is $f_L$ (this will typically be 10 MHz or higher). The accumulator structure in FIG. 17 is quite evident. Every clock period the accumulator is incremented (1702) by F_VAL (1701) (assumed to be a positive number). The value of Δn is used to define a "state" for the purposes of determining the action required to adjust F_VAL as explained shortly. The addition is assumed to be of the 2's-complement variety and overflows are ignored. The most significant bit of the accumulator register 1703 will have an oscillatory behavior with a frequency determined by F_VAL and M, the size of the accumulator. The relationship between generated frequency, $f_D$, and $f_L$, the local (high-speed) clock is given by:

$$f_D = f_L \cdot \left(\frac{F\_VAL}{2^M}\right) \qquad \text{(Eq. 11)}$$

The resolution of the NCO is given by $f_L \cdot 2^{-M}$. In this particular situation the generated frequency is ~8 kHz and we need a resolution of roughly 1 ppm for the adjustment of the sampling frequency (DAC clock) and therefore need an NCO resolution of ~10 mHz. Assuming $f_L$ is ~10 MHz implies that $2^{-M} \sim 10^9$ or M is of the order of 30 (bits). We shall assume that M=32 for specificity. Also, we assume $f_L$=10.24 MHz. Note that there are several clever ways to reduce the NCO word-length and these are not precluded. The NCO form provided is solely for illustrative purposes. The modification of the calculations provided here for other choices of NCO word-length and local clock frequency are quite straightforward.

Assuming $f_D$=8 kHz, $f_L$=10.24 MHz, and M=32, we get the nominal value for F_VAL as $$F\_VAL = 2^M \cdot \left(\frac{f_D}{f_L}\right) = 2^{32} \cdot \left(\frac{8.0}{10.24 \cdot 10^3}\right) = 3355443 \qquad \text{(Eq. 12)}$$

Generally speaking, in all NCO formulations, it is wise to establish the extreme ends of the allowable NCO control word in order that catastrophic malfunction can be avoided. To this end, we assume that the extreme values of the NCO control word (F_VAL) correspond to (8 kHz+60 ppm) and (8 kHz-60 ppm). A simple calculation provides:

$$F\_VAL\text{-MAX}=3355645 \qquad \text{(Eq.13A)}$$

$$F\_VAL\text{-MIN}=3355242 \qquad \text{(Eq.13B)}$$

Figure 19:
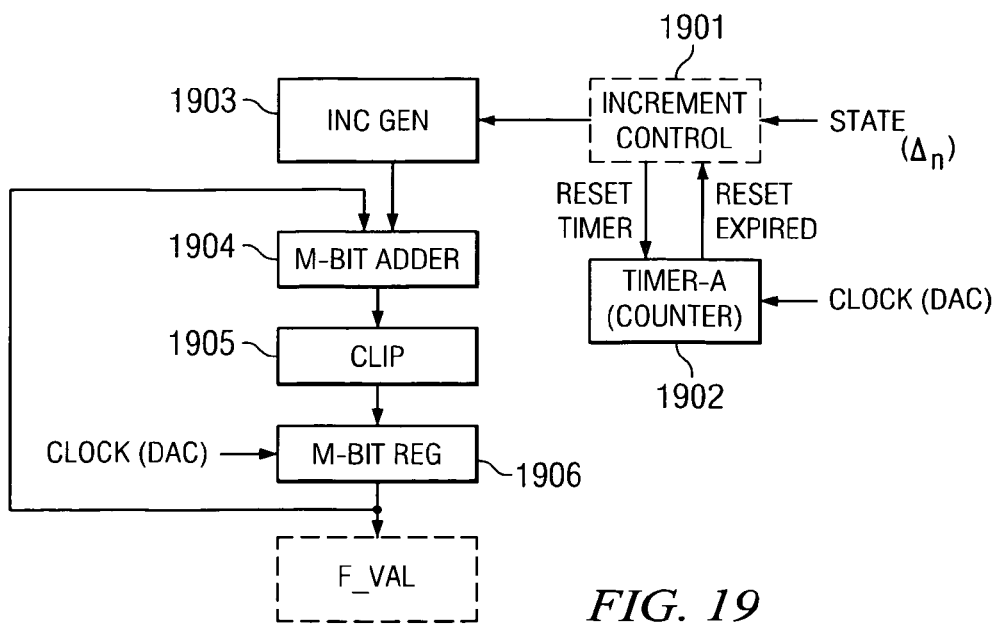
FIG. 19 shows the generation of F_VAL for adaptive clock operation, representing an embodiment of the invention.

The manner in which the NCO control word (F_VAL) is adjusted to achieve the desired adaptive clock operation is depicted in FIG. 19. The same principle applies to control of the adjustment method (FTS_VAL) illustrated in FIG. 18 and described previously. Note that although we are assuming M-bit arithmetic, a smaller word-length can be used. The word-length must be adequate to represent the range of values allowed for F_VAL.

The block 1905 labeled CLIP is not elaborated upon but described by function, which related to the maximum (and minimum) values allowed for F_VAL (and FTS_VAL). The intent is to ensure that the NCO control word does not exceed predetermined limits, designated here by F_VAL-MAX and F_VAL-MIN. Since the ATDS enhancement is intended to account for (hopefully) minor time-base offset between the ingress and egress IWFs the range of required correction should, necessarily, be small in normal circumstances and somewhat larger in situations where one or both IWF is in holdover. Assuming a 32-bit structure (M=32) and a maximum accommodation requirement of ~50×10$^{-9}$ (50 ppb), the magnitude of the adjustment should be less than ~217. In particular:

FTS_VAL_MAX=+217

FTS_VAL_MIN=−217

Since F_VAL has a nominal value (uncorrected) of ~3355443,

F_VAL_MAX=+3355645

F_VAL_MIN=+3355242

So the operation of the CLIP block can be expressed in terms of its input and output as:
  i. If F_VAL-MAX≧input≧F_VAL-MIN, then output=input
  ii. If input≧F_VAL-MAX, then output=F_VAL-MAX
  iii. If F_VAL-MIN≧input, then output=F_VAL-MIN The increment associated with increasing (or decreasing) the frequency is controlled by the 1901 block labeled "Increment control". The output of the block INC. GEN. is either +1, −1, or 0 according as the frequency of the DAC clock must be increased by 1 ppm, reduced by 1 ppm, or left unchanged. For different choices of word-lengths and different choices for frequency increment (in ppm) the value of the increment 1903 may differ from that specified. The notion of the timer 1902 is important. The intent of the timer is to prevent updates of clock rate from occurring too frequently. The interval of the updates should be somewhat greater than the time-constant of the phase locked loop (PLL in FIG. 13). Assuming a PLL time-constant of ~1 s and $f_{TS}$~1 kHz, a 10-bit saturating counter provides a timer of ~1 s and is a suitable candidate for the timer function. Alternately, since we have assumed a limit of 1 ppm/s for the allowed drift rate of the DAC clock, the timer-A interval will be roughly 1 s. Considering that the DAC clock is nominally 8 kHz, a counter length of 13 bits (8192 counts corresponds to a little more than 1 s) is appropriate. The adder 1904 sends the increment values to the accumulator 1906, which then becomes F_VAL. The counter 1902, as before, ensures that adjustments do not happen too frequently. Thus only after the timer has expired does an increment occur. The operation underlying the adaptive clock operation is implemented, to a large extent, in the 1901 block labeled "Increment control". The specific implementation is not provided but the following description is adequate for one of ordinary skill to develop a usable implementation. Again, assigning appropriate actions based on the value of Δn is a key aspect of the two methods. Comparison with Δn determines the state, the state then determines the appropriate action. In this example, two threshold values, $T_2 > T_1$ are predetermined. Suitable choices for these thresholds are provided later.

f. If |Δn|≧$T_2$, the state is "green". The implication of the "green" state is that the read and write pointers are far apart and no special action is taken. In particular, the value of the increment is 0 and F_VAL (FTS_VAL) are unchanged.

g. If $T_2$>|Δn|≧$T_1$, the state is "yellow". The implication of the "yellow" state is that the read and write pointers are possibly coming closer and some action is required.

h. If $T_1$>|Δn|>0, the state is "red". The implication of the "yellow" state is that the read and write pointers are coming very close and some significant action is required.

i. If Δn=0, the state is "catastrophic". This is equivalent to experiencing an overflow/underflow event.

Suitable values for the thresholds are $T_2$=(¾)K; $T_1$=(¼)K, where the size of the overall buffer is 2K. These choices are well suited for efficient implementation and it is unlikely that "optimum" values for these thresholds, derived by any sophisticated means, will provide an efficacy that much greater than this particular set to warrant an increase in implementation complexity. The value for K, the buffer size, depends on the expected time-delay variation. If we assume a "typical" time-delay variation will be ±1 ms, corresponding to ~±11544 UI, a suitable value for 2K is the closest power of 2 greater than the peak-to-peak time-delay variation, which, in this case, corresponds to K=2048 (B=12). K=2048 implies that the adaptive play-out buffer introduces a latency of ~1.3 ms (half the buffer size).

The following description is appropriate for F_VAL. The same algorithm is suitable for FTS_VAL with the sign of the increment inverted. This is because an increase in FTS_VAL results in an increase in the regenerated DS1 clock frequency whereas the same effect is observed with a decrease in F_VAL.

1. If State is Catastrophic (Δn=0):
        i. The Read Add. Gen. block will require "reset". No specific action required for clock control.
        ii. Reset timer. This is optional. Included for specificity.
        iii. Set increment to 0.
    2. If State is Red:
        i. If timer has not expired, set increment to 0.
        ii. If timer has expired, set increment to +2 if Δn is positive, or ~2 if Δn is negative, and reset timer.
    3. If State is Yellow:
        iii. If timer has not expired, set increment to 0.
        iv. If timer has expired, set increment to +1 if Δn is positive, or ~1 if Δn is negative, and reset timer.
    4. If State is Green:
        i. Set increment to 0. (No change in LIU clock frequency)

The description has been formatted to show how the adaptive play-out buffer and the adaptive clock operation can share information.

It should be pointed out that one of ordinary skill in the art would know how to specifically implement the method described above and how to implement an apparatus for carrying out any of the described methods. The methods can be implemented with software (computer program), hardware, or any combination of the two.

DEFINITIONS

The term program and/or the phrase computer program are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system). The phrase radio frequency is intended to mean frequencies less than or equal to approximately 300 GHz as well as the infrared spectrum.

The term substantially is intended to mean largely but not necessarily wholly that which is specified. The term approximately is intended to mean at least close to a given value (e.g., within 10% on. The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub)method, (sub)process and/or (sub)routine for achieving the recited result.

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The terms "consisting" (consists, consisted) and/or "composing" (composes, composed) are intended to mean closed language that does not leave the recited method, apparatus or composition to the inclusion of procedures, structure(s) and/or ingredient(s) other than those recited except for ancillaries, adjuncts and/or impurities ordinarily associated therewith. The recital of the term "essentially" along with the term "consisting" (consists, consisted) and/or "composing" (composes, composed), is intended to mean modified close language that leaves the recited method, apparatus and/or composition open only for the inclusion of unspecified procedure(s), structure(s) and/or ingredient(s) which do not materially affect the basic novel characteristics of the recited method, apparatus and/or composition.

Unless otherwise defined, all technical and scientific terms used herein have the same meaning as commonly understood by one of ordinary skill in the art to which this invention belongs. In case of conflict, the present specification, including definitions, will control.

CONCLUSION

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor(s) is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences. The individual components of embodiments of the invention need not be combined in the disclosed configurations, but could be combined in any and all configurations.

It can be appreciated by those of ordinary skill in the art to which embodiments of the invention pertain that various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

[1] RFC 3550, *RTP: A Transport Protocol for Real-Time Application*, Internet Engineering Task Force Request for Comment, available at www.ieff.org.

[2] RFC 3551, *RTP Profile for Audio and Video Conferences with Minimal Control*, Internet Engineering Task Force Request for Comment, available at www.ieff.org.

[3] ITU-T Recommendation G.711, *Pulse Code Modulation (PCM) of Voice Frequencies*, Geneva, 1989.

[4] Kishan Shenoi, Digital Signal Processing in Telecommunications, Prentice-Hall, 1995. ISBNO-13-096751-3.

[5] ITU-T Recommendations series G, *Transmission systems and media, digital systems and networks*, available at www.itu.int.

[6] Stefano Bregni, Synchronization of Digital Telecommunications Networks, John Wiley & Sons, 2002. ISBN 0 471 61550 1.

[7] P. K. Bhatnagar, Engineering Networks for Synchronization, CCS 7, and ISDN, IEEE Press, 1997. ISBN 0-7803-1158-2.

[8] Danny De Vleeschauwer and Jan Janssen, *Voice Performance over packet-based networks*, An Alcatel White Paper, available at www.alcatel.com.

[9] Ramachandran Ramjee, Jim Kurose, Don Townsley, and Henning Schulzrine, *Adaptive playout mechanisms for packetized audio applications in wide-area networks*, Proceedings of the Conference on Computer Communication (IEEE INFOCOM), Toronto, Canada, June 1994. Available at http://citeseer.ist.psu.edu/ramjee94adaptive.html.

[10] Aman Kansal and Abhay Karandikar, *Jitter-free audio playout over Best Effort packet networks*, in ATM Forum—International Symposium on Broadband Communication in the New Millenium, August 2001. Available at hftp://citeseer.ist.psu.edu/557994.html.

[11] Kishan Shenoi, *Synchronization implications of providing Circuit Emulation Services in an IP Network*, NFOEC/OFC, Anaheim, Calif., March 2005.

[12] ANSI T1.403, *Network and Customer Installation Interfaces—DS1 Electrical Interface*, American National Standard for Telecommunications, May 1999.

[13] ITU-T Recommendation G.824, *The control of jitter and wander within digital networks which are based on the 1544 kbit/s hierarchy*, Geneva, March 2000. Available at www.itut.int.

[14] ITU-T Recommendation Y.1413, *TDM-MPLS Networkinterworking—User plane interworking*, Geneva, March 2004. Available at www.itut.int.

[15] Paul E. Fleischer and Chi-Leung Lau, *Synchronous Residual Time Stamp for Timing Recovery in a Broadband Network*, U.S. Pat. No. 5,260,978. Issued Nov. 9, 1993. Assigned to Telcordia Technologies.

[16] William Powell, *Low Jitter Timing Recovery Technique and Device for Asynchronous Transfer Mode (ATM) Constant Bit Rate (CBR) Payloads*, U.S. Pat. No. 6,111,878, Aug. 29, 2000. Assigned to Alcatel.

[17] K. Shenoi and M. J. Narasimha, Encoding system for distribution of synchronization, U.S. Pat. No. 5,638,379. Issued Jun. 10, 1997. Assigned to Symmetricom, Inc.

[18] K. Shenoi and M. J. Narasimha, *Distribution of synchronization in a synchronous optical environment*, U.S. Pat. No. 5,828,670, Issued Nov. 27, 1998. Assigned to Symmetricom, Inc.

[19] ITU-T Recommendation G.811, *Timing Characteristics of primary reference clocks*, Geneva, September 1997. Available at www.itut.int.
[20] Bar-Giora Goldberg, Digital Techniques in Frequency Synthesis, McGraw-Hill, New York, USA, 1996. ISBN: 0-07-024166-X.
[21] ITU-T Recommendation G.703, *Physical/electrical characteristics of hierarchical digital interfaces*, Geneva, 1988. Available at www.itut.int.

What is claimed is:

1. A method of driving a numerically controlled oscillator comprising:
providing a local clock with a clock cycle;
generating an increment value based on a difference between a write address and a current read address of a jitter buffer;
adding the increment value to a prior frequency value to produce a current frequency value
storing the current frequency value; and
using the most significant bit of the current frequency value as a timing signal.

2. The method of claim 1, wherein the timing signal is used as a digital-to-analog clock of the receiving end of an electronic communication system.

3. The method of claim 1, further comprising:
adjusting the current frequency value to be within a predetermined range.

4. A machine readable storage medium, comprising a program for performing the method of claim 1.

5. The method of claim 1, further comprising:
providing a timer; and
assigning a threshold value T, wherein the increment value is generated based on the difference $\Delta n$ between the write address and the current read address of the jitter buffer based on the following criteria: if $|\Delta n| \geq T$, set the increment value to 0; if $T \geq |\Delta n| \geq 0$ and the timer has expired, set the increment value to +1 if $\Delta n > 0$ and −1 if $\Delta n < 0$, else set the increment value to 0; if $\Delta n = 0$, reset the timer and set the increment value to 0.

6. The method of claim 1, further comprising:
providing a timer; and
assigning two threshold value $T_2$ and $T_1$, where $T_2 > T_1$, wherein the increment value is generated based on the difference $\Delta n$ between the write address and the current read address of the jitter buffer based on the following criteria: if $|\Delta n| \geq T_2$, set the increment value to 0; if $T_2 \geq |\Delta n| T_1$, and the timer has expired, set the increment value to +1 if $\Delta n > 0$ and −1 if $\Delta n < 0$, else set the increment value to 0; if $T_1 \geq |\Delta n| \geq 0$ and the timer has expired, set the increment value to +2 if $\Delta n > 0$ and −2 if $\Delta n < 0$, else set the increment value to 0; if $\Delta n = 0$, reset the timer and set the increment value to 0.

7. The method of claim 1, wherein the method is used with a service clock generated by a packet-based network.

8. The method of claim 1, wherein the method is used with a service clock that is independent of a network clock of a packet-based network and the service clock is transferred over the packet-based network.

9. A method of driving a numerically controlled oscillator comprising:
providing a local clock with a clock cycle;
generating an increment value based on a difference between a write address and a current read address of a utter buffer;
adding the increment value to a prior frequency value to produce a current frequency value
storing the current frequency value; and
using the most significant bit of the current frequency value as an adjustment to an incoming timing signal.

10. The method of claim 9, further comprising:
adjusting the current frequency value to be within a predetermined range.

11. The method of claim 9, further comprising:
providing a timer; and
assigning a threshold value T, wherein the increment value is generated based on the difference $\Delta n$ between the write address and the current read address of the jitter buffer based on the following criteria: if $|\Delta n| \geq T$, set the increment value to 0; if $T \geq |\Delta n| \geq 0$ and the timer has expired, set the increment value to +1 if $\Delta n > 0$ and −1 if $\Delta n < 0$, else set the increment value to 0; if $\Delta n = 0$, reset the timer and set the increment value to 0.

12. The method of claim 9, further comprising:
providing a timer; and assigning two threshold value $T_2$ and $T_1$, where $T_2 > T_1$, wherein the increment value is generated based on the difference $\Delta n$ between the write address and the current read address of the jitter buffer based on the following criteria: if $|\Delta n| \geq T_2$, set the increment value to 0; if $T_2 \geq |\Delta n| \geq T_1$, and the timer has expired, set the increment value to +1 if $\Delta n > 0$ and −1 if $\Delta n < 0$, else set the increment value to 0; if $T_1 \geq |\Delta n| \geq 0$ and the timer has expired, set the increment value to +2 if $\Delta n > 0$ and −2 if $\Delta n < 0$, else set the increment value to 0; if $\Delta n = 0$, reset the timer and set the increment value to 0.

13. The method of claim 9, wherein the method is used with a service clock generated by a packet-based network.

14. The method of claim 9, wherein the method is used with a service clock that is independent of a network clock of a packet-based network and the service clock is transferred over the packet-based network.

15. A method of driving a numerically controlled oscillator comprising:
providing a local clock with a clock cycle;
providing a timer;
providing a jitter buffer having a write address and a current read address;
generating the difference between the write address and a current read address;
assigning a threshold value T;
generating an increment value based on the difference $\Delta n$ between the write address and the current read address of the jitter buffer based on the following criteria: if $|\Delta n| \geq T$, set the increment value to 0; if $T \geq |\Delta n| \geq 0$ and the timer has expired, set the increment value to +1 if $\Delta n > 0$ and −1 if $\Delta n < 0$, else set the increment value to 0; if $\Delta n = 0$, reset the timer and set the increment value to 0;
adding the increment value to a first accumulator;
clipping the first accumulator value to within a predetermined range;
adding the first accumulator value to a second accumulator; and
using the most significant bit of the second accumulator value as a timing signal.

16. An apparatus comprising:
a local clock with a clock cycle;
an accumulator register;
a jitter buffer that is accessed using a write address and a current read address; and
an increment control unit, wherein the increment control unit sets an increment value that is to be added to a frequency value in the accumulator register, based on a difference between the write address and the current read address of the utter buffer, and wherein the most significant bit of the accumulator register functions as a timing signal.

17. An integrated circuit, comprising the apparatus of claim 16.

18. A circuit board, comprising the integrated circuit of claim 17.

19. A computer, comprising the circuit board of claim 18.

20. A network, comprising the computer of claim 19.

21. The apparatus of claim 16, wherein the jitter buffer is a dual-port RAM device.

22. The apparatus of claim 16, wherein the jitter buffer is organized as a modulo-2N circular buffer.

23. An apparatus comprising:
a local clock with a clock cycle;
an accumulator register;
a utter buffer that is accessed using a write address and a current read address; and
an increment control unit, wherein the increment control unit sets an increment value that is to be added to a frequency value in the accumulator register, based on a difference between the write address and the current read address of the utter buffer, and wherein the most significant bit of the accumulator register functions as an adjustment to an incoming timing signal.

24. An integrated circuit, comprising the apparatus of claim 23.

25. A circuit board, comprising the integrated circuit of claim 24.

26. A computer, comprising the circuit board of claim 25.

27. A network, comprising the computer of claim 26.

28. The apparatus of claim 23, wherein the jitter buffer is a dual-port RAM device.

29. The apparatus of claim 23, wherein the jitter buffer is organized as a modulo-2N circular buffer.

* * * * *

UNITED STATES PATENT AND TRADEMARK OFFICE
CERTIFICATE OF CORRECTION

PATENT NO. : 7,636,022 B2  Page 1 of 1
APPLICATION NO. : 11/451652
DATED : December 22, 2009
INVENTOR(S) : Shenoi et al.

It is certified that error appears in the above-identified patent and that said Letters Patent is hereby corrected as shown below:

In column 41 line 64, replace "utter" with -- jitter --.

In column 43 line 1, replace "utter" with -- jitter --.

In column 43 line 17, replace "utter" with -- jitter --.

In column 44 line 5, replace "utter" with -- jitter --.

Signed and Sealed this

Twenty-third Day of November, 2010

David J. Kappos
*Director of the United States Patent and Trademark Office*